United States Patent
Sakoh et al.

(10) Patent No.: US 7,603,335 B2
(45) Date of Patent: Oct. 13, 2009

(54) ACQUISITION OF ATTRIBUTE AND ACCOUNTING INFORMATION WITH COMMUNICATION INTERRUPTION

(75) Inventors: Noriyuki Sakoh, Kanagawa (JP); Takeshi Iwatsu, Kanagawa (JP); Jun Moriya, Tokyo (JP); Yasuhiro Murase, Tokyo (JP)

(73) Assignee: Sony Corporation, Tokyo (JP)

( * ) Notice: Subject to any disclaimer, the term of this patent is extended or adjusted under 35 U.S.C. 154(b) by 357 days.

(21) Appl. No.: 10/571,540

(22) PCT Filed: May 19, 2004

(86) PCT No.: PCT/JP2004/007121

§ 371 (c)(1),
(2), (4) Date: Mar. 10, 2006

(87) PCT Pub. No.: WO2005/033994

PCT Pub. Date: Apr. 14, 2005

(65) Prior Publication Data

US 2007/0033192 A1   Feb. 8, 2007

(30) Foreign Application Priority Data

Sep. 30, 2003   (JP)   .............................. 2003-339138

(51) Int. Cl.
*G06F 17/00* (2006.01)
*G06N 5/04* (2006.01)
*G06F 15/18* (2006.01)

(52) U.S. Cl. .......................................... 706/61; 707/10

(58) Field of Classification Search .................. 706/61; 707/10

See application file for complete search history.

(56) References Cited

U.S. PATENT DOCUMENTS 5,717,604 A * 2/1998 Wiggins ...................... 709/229

(Continued)

FOREIGN PATENT DOCUMENTS

JP   9-265456   10/1997

(Continued)

OTHER PUBLICATIONS

Jeffray et al. "Accounting for interrupt handling costs in dynamic priority tasksystems", Real-Time Systems Symposium, 1993., Proceedings. 1993, pp. 212-221.*

(Continued)

*Primary Examiner*—Joseph P. Hirl
*Assistant Examiner*—Liwu Chang
(74) *Attorney, Agent, or Firm*—Oblon, Spivak, McClelland, Maier & Neustadt, L.L.P.

(57) ABSTRACT

An attribute information acquisition method, including transmitting an attribute request for contents attribute information for altering attributes of contents data stored in a storage medium to an attribute information providing apparatus. The method also includes receiving the contents attribute information transmitted from the attribute information providing apparatus as a result of the transmission of the attribute request. Further, the method includes transmitting to an accounting status notification apparatus a notification request for accounting status notification information that indicates whether an accounting process that corresponds to the contents attribute information has been completed, when a communication enabled state with the attribute information providing apparatus is restored after communication with the attribute information providing apparatus is interrupted during the receiving the contents attribute information. In addition, the method includes receiving the accounting status notification information transmitted from the accounting status notification apparatus as a result of transmitting the notification request.

19 Claims, 19 Drawing Sheets

U.S. PATENT DOCUMENTS

| | | | |
|---|---|---|---|
| 6,434,126 B1 * | 8/2002 | Park | 370/328 |
| 6,567,657 B1 * | 5/2003 | Holly et al. | 455/408 |
| 7,080,048 B1 * | 7/2006 | Sines et al. | 705/75 |
| 7,277,857 B1 * | 10/2007 | Balaji et al. | 704/270 |
| 2002/0049717 A1 * | 4/2002 | Routtenberg et al. | 707/1 |
| 2002/0077978 A1 * | 6/2002 | O'Leary et al. | 705/40 |
| 2003/0163721 A1 * | 8/2003 | Hildenbrand et al. | 713/200 |
| 2003/0233361 A1 * | 12/2003 | Cady | 707/10 |
| 2004/0254843 A1 * | 12/2004 | Koch | 705/26 |
| 2005/0060701 A1 | 3/2005 | Murase | |
| 2005/0091679 A1 | 4/2005 | Tanaka et al. | |

FOREIGN PATENT DOCUMENTS

| | | |
|---|---|---|
| JP | 2002-30322 | 1/2002 |
| JP | 2002-288142 | 10/2002 |
| JP | 2002-344484 | 11/2002 |
| JP | 2003-16041 | 1/2003 |
| JP | 2003-116113 | 4/2003 |
| WO | WO 2005033994 A1 * | 4/2005 |

OTHER PUBLICATIONS

U.S. Appl. No. 10/526,902, filed Aug. 16, 2005, Yamashita et al.
U.S. Appl. No. 10/554,542, filed Oct. 25, 2005, Iwatsu et al.
U.S. Appl. No. 10/564,317, filed Jan. 12, 2006, Kikkoji et al.
U.S. Appl. No. 10/557,207, filed Nov. 17, 2005, Kikkoji et al.
U.S. Appl. No. 10/555,654, filed Nov. 4, 2005, Kikkoji et al.
U.S. Appl. No. 10/556,944, filed Nov. 16, 2005, Kikkoji et al.
U.S. Appl. No. 10/563,258, filed Jan. 4, 2006, Iwatsu et al.
U.S. Appl. No. 10/557,141, filed Nov. 17, 2005, Murase et al.
U.S. Appl. No. 10/556,728, filed Nov. 14, 2005, Iwatsu et al.
U.S. Appl. No. 10/563,315, filed Jan. 4, 2006, Iwatsu et al.
U.S. Appl. No. 10/557,193, filed Nov. 17, 2005, Kikkoji et al.
U.S. Appl. No. 10/566,630, filed Jan. 31, 2006, Sakoh et al.
U.S. Appl. No. 10/561,187, filed Dec. 16, 2005, Araki et al.
U.S. Appl. No. 10/565,965, filed Jan. 26, 2006, Iwatsu.
U.S. Appl. No. 10/564,058, filed Jan. 10, 2006, Kikkoji et al.
U.S. Appl. No. 10/556,893, filed Nov. 15, 2005, Sakoh et al.
U.S. Appl. No. 10/557,040, filed Nov. 16, 2005, Kikkoji et al.
U.S. Appl. No. 10/556,729, filed Nov. 14, 2005, Kikkoji et al.
U.S. Appl. No. 10/555,990, filed Nov. 8, 2005, Murase et al.
U.S. Appl. No. 10/560,229, filed Dec. 12, 2005, Kikkoji et al.
U.S. Appl. No. 10/564,062, filed Jan. 10, 2006, Kikkoji et al.
U.S. Appl. No. 10/567,689, filed Feb. 9, 2006, Kikkoji et al.
U.S. Appl. No. 10/567,033, filed Feb. 3, 2006, Sakoh et al.
U.S. Appl. No. 10/572,743, filed Mar. 21, 2006, Kikkoji et al.
U.S. Appl. No. 10/564,414, filed Jan. 12, 2006, Sakoh et al.
U.S. Appl. No. 10/567,776, filed Feb. 9, 2006, Iwatsu et al.
U.S. Appl. No. 10/568,968, filed Feb. 22, 2006, Okuzawa.
U.S. Appl. No. 10/569,227, filed Feb. 23, 2006, Yasuda.
U.S. Appl. No. 10/573,580, filed Mar. 24, 2006, Sakoh et al.
U.S. Appl. No. 10/573,418, filed Mar. 27, 2006, Iwatsu et al.
U.S. Appl. No. 10/571,458, filed Mar. 13, 2006, Iwatsu et al.
U.S. Appl. No. 10/571,774, filed Mar. 15, 2006, Sakoh et al.
U.S. Appl. No. 10/573,647, filed Mar. 28, 2006, Kikkoji et al.
"Statement in accordance with the Notice from the European Patent Office dated Oct. 1, 2007 concerning business methods (OJ Nov. 2007; p. 592-593)", XP-002456252, 3 pages.

* cited by examiner

315 ACQUISITION/USE FILE

| CONTENTS ACQUIRING ADDRESS |
| ATTRIBUTE FILE ACQUIRING ADDRESS |

FIG. 23

| 1ST LOG | ACCOUNTING STATUS NOTIFICATION REQUEST INFORMATION | PURCHASE IDENTIFICATION INFORMATION<br>RETRY ADDRESS<br>POST DATA<br>REQUEST CODE |
|---|---|---|
| 2ND LOG | TRACK FILE NAME<br>ATTRIBUTE INFORMATION FILE NAME | |
| 3RD LOG | ALBUM IDENTIFICATION INFORMATION | |

FIG. 24

ACQUISITION OF ATTRIBUTE AND ACCOUNTING INFORMATION WITH COMMUNICATION INTERRUPTION

TECHNICAL FIELD

This invention relates to an attribute information acquisition method that can suitably be used for acquiring contents attribute information necessary for altering attributes relative to reproduction of contents data of a piece of music along with the contents data at a client terminal from a server by way of a network.

BACKGROUND ART

In conventional data delivery systems, a delivery apparatus divides the contents data to be delivered into blocks, or unit data, of a predetermined size and sequentially transmits the contents data to a communication terminal on a unit data by unit data basis in a communication enabled state. Then, the communication terminal sequentially receives the unit data transmitted from the delivery apparatus and stores the block IDs fitted to the received respective unit data.

If the delivery is suspended because of a communication disabled state that arises before all the contents data are transmitted from the delivery apparatus, the communication terminal notifies the delivery apparatus of the block IDs of the unit data it has already received when the communication enabled state is restored. Then, the delivery apparatus identifies the blocks that have already been delivered and the blocks that have not been delivered yet out of the contents data according to the block IDs and transmits the unit data of the delivered blocks that have not been delivered yet to the communication terminal. With this arrangement, the delivery apparatus can practically avoid delivery of same blocks in duplicate and reliably transmit the blocks that have not been delivered because of the suspension of delivery to the communication terminal.

When the delivery apparatus delivers the contents data to the communication terminal for a charge, it executes an accounting process after the completion of the transmission of all the contents data to the communication terminal. Then, the delivery apparatus transmits a message to the communication terminal, notifying that the delivery of the contents has been completed and the accounting process has been properly executed (see, inter alia, Patent Document 1: Jpn. Pat. Appln. Laid-Open Publication No. 2002-135350 (pages 1, 6 and 11, FIGS. 1 and 17).

When the delivery apparatus of the data delivery system having the above described configuration delivers contents data for a charge, the delivery apparatus may transmit contents attribute information to the communication terminal after the transmission of the contents data for the purpose of altering the attributes relative to reproduction of the contents data in order to protect the copyright of the contents data. In other words, the communication terminal can reproduce the contents data according to what the contents attribute information tells only when it receives the contents attribute information along with the contents data. As for the delivery apparatus, when it transmits contents data to the communication terminal as charged service, it executes the accounting process while it is transmitting the contents attribute information to the communication terminal.

However, if the communication line between the delivery apparatus and the communication terminal is disconnected probably because of stoppage of power supply while the communication terminal is receiving the contents attribute information from the delivery apparatus of such a data delivery system, the copyright owner of the contents data can suffer economic losses when the transmission of the contents attribute information is completed but the accounting process is interrupted. Additionally, there can arise a situation where the user suffer economic losses because the accounting process is completed although the reception of the contents attribute information is not completed yet because of the disconnection of the communication line in such a data transmission system.

To date, when the communication line is disconnected while the communication terminal is receiving contents in such a data delivery system, it is not possible for the communication terminal to know if the accounting process is interrupted because of the disconnection of the communication line or if the accounting process is completed although the communication line is disconnected. Thus, there arises a problem that the communication terminal cannot properly handle such a situation when the communication enabled state is restored from the disconnection of the communication line relative to the delivery apparatus.

DISCLOSURE OF THE INVENTION

In view of the above identified problem, it is therefore an object of the present invention to provide an attribute information acquisition method with which such a situation can be properly handled when a communication enabled state is restored from disconnection of a communication line.

In an aspect of the present invention, the above object is achieved by providing an attribute information acquisition method including: an attribute request information transmission step of transmitting attribute request information requesting contents attribute information for altering attributes of contents data stored in a storage medium to an attribute information providing apparatus; an attribute information reception step of receiving the contents attribute information transmitted from the attribute information providing apparatus as a result of the transmission of the attribute request information to the attribute information providing apparatus; a notification request information transmission step of transmitting notification request information of requesting accounting status notification information indicating if the accounting process corresponding to the contents attribute information is completed or not when the communication enabled state with the attribute information providing apparatus is restored after a disconnection of the communication line to the attribute information providing apparatus while receiving the contents attribute information to an accounting status notification apparatus; and a notification information reception step of receiving the accounting status notification information transmitted from the accounting status notification apparatus as a result of transmitting the notification request information to the accounting status notification apparatus.

Thus, with an attribute information acquisition method according to the present invention, when a communication enabled state is restored after a disconnection of the communication line for receiving contents attribute information, it is possible to notify accounting status notification information telling if the accounting process that corresponds to the contents attribute information has been completed or not at the time of the disconnection of the communication line by means of accounting status notification information.

In another aspect of the present invention, there is provided an accounting status notification method including: a notification request information reception step of receiving notification request information requesting accounting status notification information indicating if the accounting process corresponding to the contents attribute information for altering the attribute of the contents data stored in a storage medium is completed or not when a communication enabled state is restored with an attribute information providing apparatus after a disconnection of the communication line to the attribute information providing apparatus at the time of receiving the contents attribute information from an attribute information acquisition apparatus for receiving the contents attribute information transmitted from the attribute information providing apparatus as a result of transmitting the attribute request information requesting the contents attribute information to the attribute information providing apparatus; and a notification information transmission step of transmitting accounting status notification information corresponding to the received notification request information to the attribute information acquisition apparatus.

Thus, with an accounting status notification method according to the present invention, when a communication enabled state is restored after a disconnection of the communication line for receiving contents attribute information, it is possible to notify accounting status notification information telling if the accounting process that corresponds to the contents attribute information has been completed or not at the time of the disconnection of the communication line by means of accounting status notification information.

In still another aspect of the present invention, there is provided an attribute information acquisition apparatus including: an attribute request information transmission means for transmitting attribute request information requesting contents attribute information for altering the attributes of contents data stored in a storage medium to an attribute information providing apparatus; an attribute information reception means for receiving the contents attribute information transmitted from the attribute information providing apparatus as a result of the transmission of the attribute request information to the attribute information providing apparatus; a notification request information transmission means for transmitting notification request information of requesting accounting status notification information indicating if the accounting process corresponding to the contents attribute information is completed or not when the communication enabled state with the attribute information providing apparatus is restored after a disconnection of the communication line to the attribute information providing apparatus while receiving the contents attribute information to an accounting status notification apparatus; and a notification information reception means for receiving the accounting status notification information transmitted from the accounting status notification apparatus as a result of transmitting the notification request information to the accounting status notification apparatus.

Thus, with an attribute information acquisition apparatus according to the present invention, when a communication enabled state is restored after a disconnection of the communication line for receiving contents attribute information, it is possible to notify if the accounting process that corresponds to the contents attribute information has been completed or not at the time of the disconnection of the communication line by means of accounting status notification information transmitted from an accounting status notification apparatus.

In still another aspect of the present invention, there is provided an accounting status notification apparatus including: a notification request information reception means for receiving notification request information requesting accounting status notification information indicating if the accounting process corresponding to the contents attribute information for altering the attribute of the contents data stored in a storage medium is completed or not when a communication enabled state is restored with an attribute information providing apparatus after a disconnection of the communication line to the attribute information providing apparatus at the time of receiving the contents attribute information from an attribute information acquisition apparatus for receiving the contents attribute information transmitted from the attribute information providing apparatus as a result of transmitting the attribute request information requesting the contents attribute information to the attribute information providing apparatus; and a notification information transmission means for transmitting accounting status notification information corresponding to the received notification request information to the attribute information acquisition apparatus.

Thus, with an accounting status notification apparatus according to the present invention, when a communication enabled state is restored in an attribute information acquisition apparatus after a disconnection of the communication line for receiving contents attribute information, it is possible to notify if the accounting process that corresponds to the contents attribute information has been completed or not at the time of the disconnection of the communication line by means of accounting status notification information.

In still another aspect of the present invention, there is provided an attribute information acquisition program for causing an information processing apparatus to execute: an attribute request information transmission step of transmitting attribute request information for altering the attributes of the contents data stored in a storage medium to an attribute information providing apparatus; an attribute information reception step of receiving the contents attribute information transmitted from the attribute information providing apparatus as a result of the transmission of the attribute request information to the attribute information providing apparatus; a notification request information transmission step of transmitting notification request information of requesting accounting status notification information indicating if the accounting process corresponding to the contents attribute information is completed or not when the communication enabled state is restored with the attribute information providing apparatus after a disconnection of the communication line to the attribute information providing apparatus while receiving the contents attribute information to an accounting status notification apparatus; and a notification information reception step of receiving the accounting status notification information transmitted from the accounting status notification apparatus as a result of transmitting the notification request information to the accounting status notification apparatus.

Thus, with an attribute information acquisition program according to the present invention, when a communication enabled state is restored after a disconnection of the communication line for receiving contents attribute information, it is possible to notify an information processing apparatus if the accounting process that corresponds to the contents attribute information has been completed or not at the time of the disconnection of the communication line by means of accounting status notification information.

In a further aspect of the present invention, there is provided an accounting status notification program for causing an information processing apparatus to execute: a notification request information reception step of receiving notification request information requesting accounting status notification information indicating if the accounting process corresponding to the contents attribute information for altering the attribute of the contents data stored in a storage medium is completed or not when a communication enabled state is restored with an attribute information providing apparatus after a disconnection of the communication line to the attribute information providing apparatus at the time of receiving the contents attribute information from an attribute information acquisition apparatus for receiving the contents attribute information transmitted from the attribute information providing apparatus as a result of transmitting the attribute request information requesting the contents attribute information to the attribute information providing apparatus; and a notification information transmission step of transmitting accounting status notification information corresponding to the received notification request information to the attribute information acquisition apparatus.

Thus, with an accounting status notification program according to the present invention, when a communication enabled state is restored after a disconnection of the communication line for receiving contents attribute information at the source of the contents attribute information, it is possible to notify the an information processing apparatus if the accounting process that corresponds to the contents attribute information has been completed or not at the time of the disconnection of the communication line by causing the source of acquisition to transmit accounting status notification information.

According to the present invention, it is so arranged that, when a communication enabled state is restored after a disconnection of the communication line at the time when receiving contents attribute information as a response to the transmission of attribute request information requesting contents attribute information for altering the attributes of the contents data stored in a storage medium, notification request information of requesting accounting status notification information indicating if the accounting process corresponding to the contents attribute information is completed or not is transmitted to an accounting status notification apparatus and accounting status notification information is received from the accounting status notification apparatus. With this arrangement, it is possible to notify accounting status notification information telling if the accounting process that corresponds to the contents attribute information has been completed or not at the time of the disconnection of the communication line by means of accounting status notification information transmitted from the accounting status notification apparatus when a communication enabled state is restored after the disconnection of the communication line that takes place when receiving the contents attribute information. Thus, it is possible to realize an attribute information acquisition method, an accounting status notification method, an attribute information acquisition apparatus, an accounting status notification apparatus, an attribute information acquisition program and an accounting status notification program that can accurately handle any situation when a connection line is restored after a disconnection.

BRIEF DESCRIPTION OF THE DRAWINGS

FIG. 23 is a schematic illustration of an acquisition/use file, showing the configuration thereof. and FIG. 24 is a schematic illustration of a log showing the progress of an acquisition process.

BEST MODE FOR CARRYING OUT THE INVENTION

Now, an embodiment of the present invention will be described in greater detail by referring to the accompanying drawings.

(1) Overall Configuration of Data Delivery System

Figure 1:
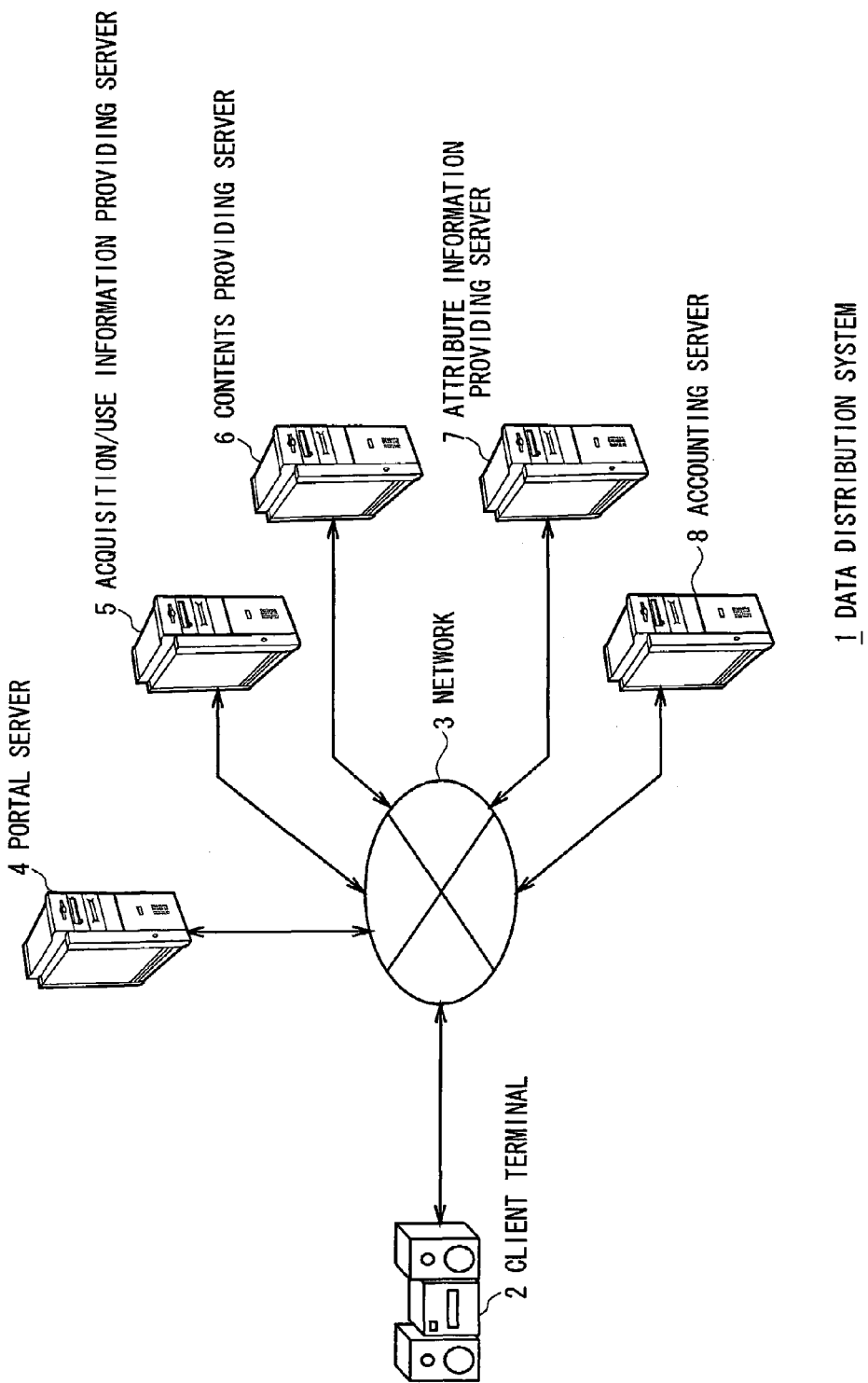
FIG. 1 is a schematic illustration of an embodiment of data delivery system according to the invention, showing the entire configuration and its components in perspective views.

Referring firstly to FIG. 1, 1 generally denotes a data delivery system according to the invention. As a user makes a request for purchasing one or more than one recorded pieces of music, utilizing music delivery service provided on network 3 such as the Internet, by means of client terminal 2 he or she has, the client terminal 2 accesses acquisition/use information providing server 5, which comprises a computer, by way of another server 4, which also comprises a computer (to be referred to as portal server hereinafter) and runs a portal site. Then, the client terminal 2 acquires an acquisition/use file to be used to acquire contents attribute information necessary for altering the attributes of the contents data relating to reproduction of the one or more than one recorded pieces of music and so on that correspond to the one or more than one recorded pieces of music that the user made the request for purchasing from the acquisition/use information providing server 5.

As a result, the client terminal 2 acquires the contents data of the one or more than one recorded pieces of music that the user made a request for purchasing from the contents providing server 6, which comprises a computer, according to the described contents of the acquisition/use file. The client terminal 2 also acquires a contents attribute file for the recorded piece of or each of the recorded pieces of music that stores contents attribute information corresponding to the contents data of the recorded piece of music from the attribute information providing server 7, which comprises a computer, according to the described contents of the acquisition/use file.

At this time, accounting server 8, which also comprises a computer, executes an accounting process for the user who made the request for purchasing the one or more than one recorded pieces of music according to price of the contents data and that of the contents attribute file or files acquired by the client terminal 2. As a result, the data delivery system 1 allows the user who utilizes the client terminal 2 to purchase the one or more than one recorded pieces of music that he or she wants in the form of contents data and a contents attribute file or contents attribute files, whichever appropriate.

In this way, the client terminal 2 acquires the contents data and the contents attribute file or files together in response to the request he or she made for purchasing the one or more than one recorded pieces of music. Then, as the user requests the client terminal 2 to reproduce the one or more than one recorded pieces of music, the contents can let the user listen to the piece or one or more than one recorded pieces of music by reproducing the corresponding contents data according to the contents attribute information in the contents attribute file or files, whichever appropriate.

(1-1) Configuration of Portal Server 4

Figure 2:
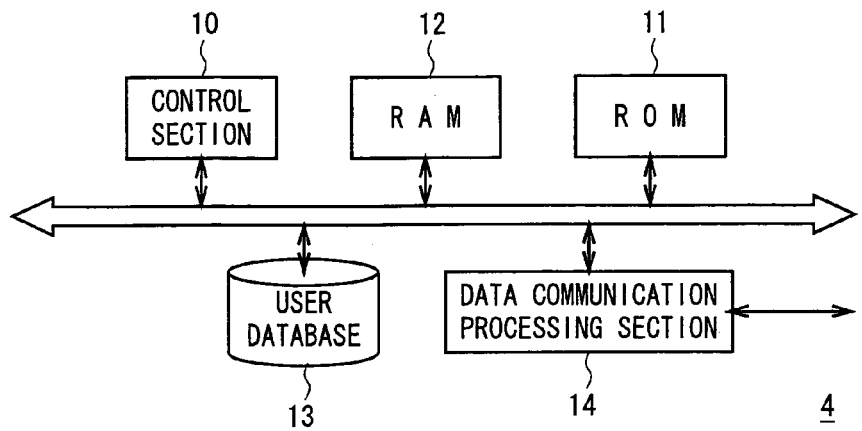
FIG. 2 is a schematic block diagram of the portal server, showing the circuit configuration thereof.

Now, referring to FIG. 2, control section 10 comprising a CPU (central processing unit) of the portal server 4 comprehensively controls the portal server 4 and executes various processes according to a basic program such as an OS (operating system) it starts operating by way of a ROM (read only memory) 11 and a RAM (random access memory) 12 and various application programs including an accounting status notification program and a contents delivery service program and the like.

More specifically, the control section 10 stores personal information including identification information of each user who is authorized to utilize the data delivery system 1 (to be referred to as user ID hereinafter) and a pass word assigned to the user in a user database 13. As the client terminal 2 transmits music purchase request data according to the request made by the user for purchasing one or more than one recorded pieces of music, the control section 10 receives the music purchase request data byway of data communication processing section 14. Then, the control section 10 executes an authentication process on the user according to the user ID and the password stored in the music purchase request data and the personal information stored in the user database 13.

If the control section 10 personally authenticates the user who made the request for purchasing one or more than one recorded pieces of music as a result, it stores the user ID of the user and transmits accounting ID issuance request data requesting issuance of identification information that makes an accounting process on the user identifiable (to be referred to as accounting ID hereinafter) to the accounting server 8 by way of the data communication processing section 14.

Then, after having the accounting server 8 issue an accounting ID and acquiring it as a result, the control section 10 transmits the acquired accounting ID to the client terminal 2 by way of the data communication processing section 14 as accounting ID notification data and has the user confirm if he or she really purchase the one or more than one recorded pieces of music or not.

As the client terminal 2 transmits acquisition/use information request data in response to the confirmation by the user who utilizes the client terminal 2 of the expected purchase of the one or more than one recorded pieces of music, the control section 10 receives the data by way of data communication processing section 14. Then, the control section 10 generates identification information that makes the contents data, which are stored in the music purchase request data, of the one or more than one recorded pieces of music that are requested for purchasing identifiable (to be referred to as contents ID hereinafter) and file request data storing the accounting ID. Then, the control section 10 transmits the file request data to the acquisition/use information providing server 5 by way of the data communication processing section 14. As a result, the control section 10 receives an acquisition/use file transmitted from the acquisition/use information providing server 5 and transfers the acquisition/use file it received to the client terminal 2 by way of the data communication processing section 14.

Additionally, after transmitting the acquisition/use file to the client terminal 2, the control section 10 relates the accounting ID and the file name of the acquisition/use file to the personal information of the user who made the request for purchasing the one or more than one recorded pieces of music in the user database 13.

Meanwhile, when the communication enabled state of the communication line connecting the client terminal 2 and the attribute information providing server 7 is restored after a disconnection of the communication line that took place while a process of acquiring contents data and one or more than one contents attribute files in response to a request for purchasing one or more than one recorded pieces of music from the user (to be referred to simply as acquisition process hereinafter)(that is, halfway through the acquisition process), the client terminal 2 transmits accounting status notification request data for confirming the accounting status that indicate if the accounting process (that corresponds to the acquisition of the contents data and the contents attribute file or files) on the user who made the request for purchasing one or more than one recorded pieces of music is completed or not to the portal server 4. Thus, the control section 10 receives the accounting status notification request data by way of the data communication processing section 14.

The accounting status notification request data stores the accounting ID transmitted from the portal server 4 to the client terminal 2 when the acquisition process that had been interrupted due to the disconnection of the communication line was resumed. Besides, the attribute information providing server 7 manages the accounting status notification information showing the accounting status on the user. Therefore, as the control section 10 receives the accounting status notification request data from the client terminal 2, it acquires the accounting status notification information requested by the client terminal 2 from the attribute information providing server 7 according to the accounting ID stored in the accounting status notification request data.

Figure 3:
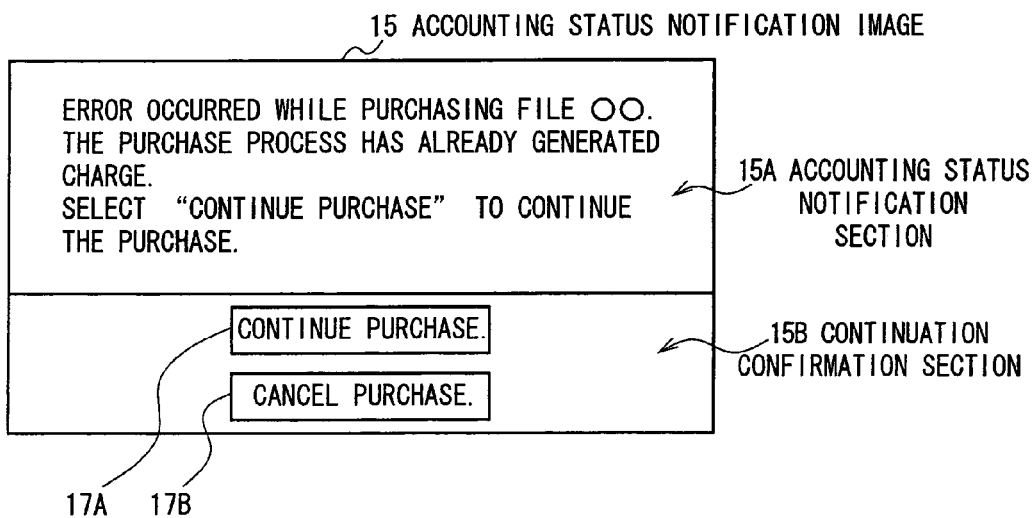
FIG. 3 is a schematic illustration of an accounting status notification image to be displayed when an accounting process is completed.
Figure 4:
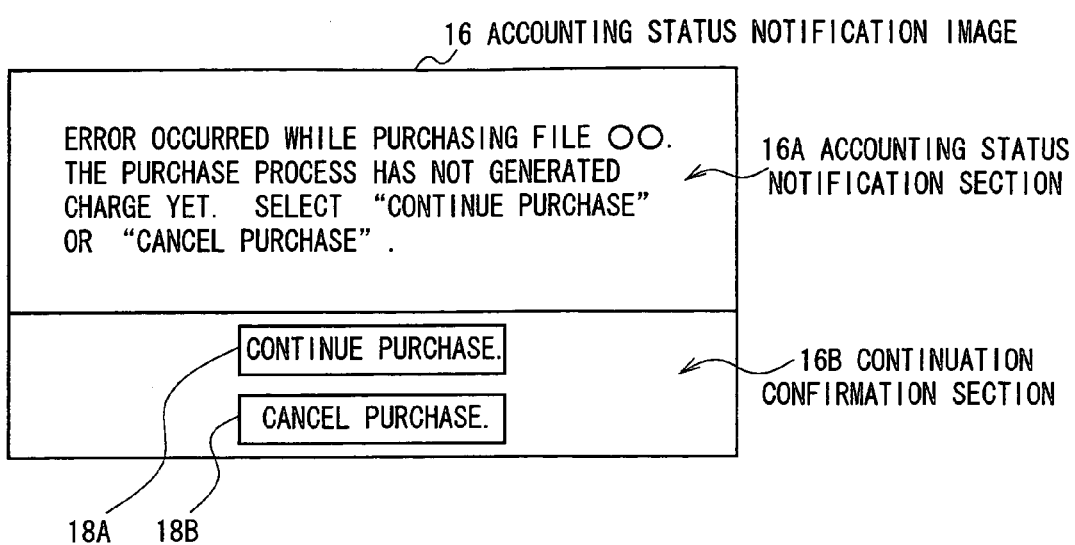
FIG. 4 is a schematic illustration of an accounting status notification image to be displayed when an accounting process is not completed.

Then, the control section 10 generates accounting status notification images 15 and 16 as shown in FIGS. 3 and 4 according to the accounting status notification information. Thus, the control section 10 transmits the accounting status notification image 15 or 16 as accounting status notification image data to the client terminal 2 by way of the data communication processing section 14 according to the accounting status relative to the user.

One of the accounting status notification images, or the accounting status notification image 15 illustrated in FIG. 3 is generated so as to notify that the accounting process for the acquisition process that was interrupted due to the disconnection of the communication line at the client terminal 2 has been completed. The accounting status notification image 15 contains a text that notifies accounting status notification section 15A, which corresponds to an upper half of the image, of the fact that the accounting process has been completed and a text that prompts the user to continue the process of purchasing the one or more than one recorded pieces of music that has been interrupted (or the interrupted acquisition process).

The accounting status notification image 15 additionally contains a purchase continuation button 17A for selecting continuation of the purchase of the one or more than one recorded pieces of music and a purchase cancel button 17B for selecting cancellation of the purchase of the one or more than one recorded pieces of music in a lower half of the image for continuation confirmation section 15B. Thus, the accounting status notification image 15 can make a user who uses the client terminal 2 select either continuation or cancellation of the process of purchasing the pieces of music.

On the other hand, the other accounting status notification image 16 illustrated in FIG. 4 is generated so as to notify that the accounting process for the acquisition process that was interrupted due to the disconnection of the communication line at the client terminal 2 has not completed yet. The accounting status notification image 16 contains a text that notifies accounting status notification section 16A, which corresponds to an upper half of the image, of the fact that the accounting process has not been completed yet and a text that prompts the user to select either continuation or cancellation of the process of purchasing the one or more than one recorded pieces of music that has been interrupted, although the accounting process has not been completed yet.

The accounting status notification image 16 additionally contains a purchase continuation button 17A and a purchase cancellation button 17B in a continuation confirmation section 16B which corresponds to a lower half of image so that the user who is utilizing the client terminal 2 may select either continuation or cancellation of the process of purchasing the one or more than one recorded pieces of music on the accounting status notification image 16.

In this way, the control section 10 notifies if the accounting process has been completed or not to the user at the client terminal 2 and asks the user to decide how to respond to the notification (in other words if the user continues or cancels the interrupted acquisition process).

(1-2) Configuration of Acquisition/use Information Providing Server 5

Figure 5:
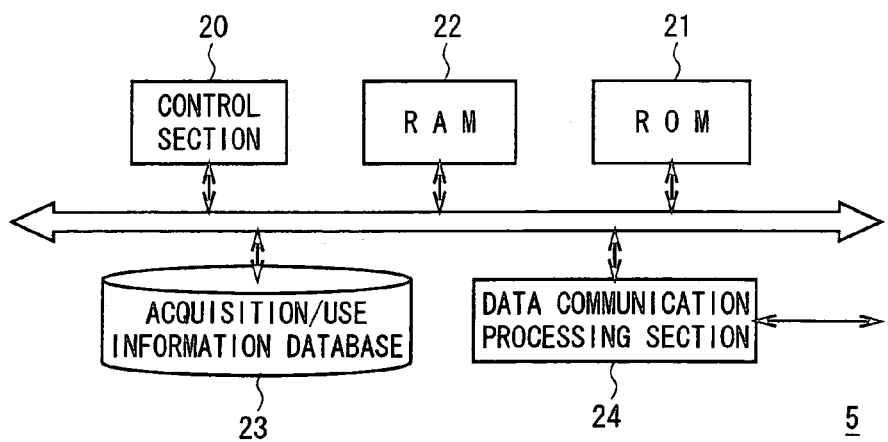
FIG. 5 is a schematic block diagram of the acquisition/use information providing server, showing the circuit configuration thereof.
Figure 6:
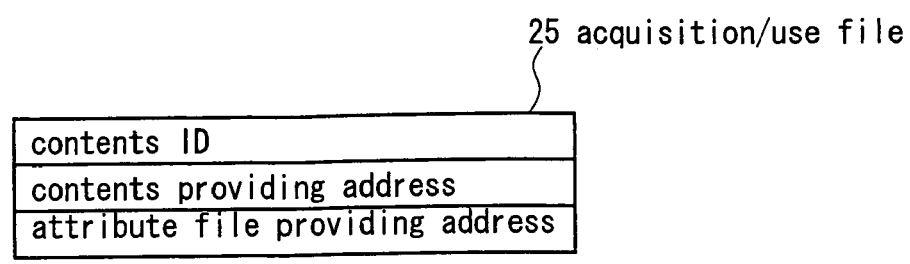
FIG. 6 is a schematic illustration of an acquisition/use file, showing its configuration.

Referring now to FIG. 5, control section 20 comprising a CPU of the acquisition/use information providing server 5 comprehensively controls acquisition/use information providing server 5 and executes various processes according to a basic program such as an OS it starts operating by way of a ROM 21 and a RAM 22 and various application programs including an acquisition/use information providing program and so forth.

For each recorded piece of music, the control section 20 stores the contents ID of the contents data, the address (URL: uniform resource locator) of the home page opened for the contents providing server 6 to provide the contents data (to be referred to as contents providing home page hereinafter) and the address (URL) of the home page opened for the attribute information providing server 7 to provide the contents attribute file in an acquisition/use information database 23.

Thus, as the control section 20 receives the file request data transmitted from the portal server 4 by way of the data communication processing section 24, it detects the address or addresses of one or more than one contents providing home pages (to be referred to as contents providing address hereinafter) that correspond to the one or more than one contents IDs of the one or more than one recorded pieces of music requested for purchasing from the acquisition/use information database 23 based on the contents ID stored in the file request data and the address or addresses of the one or more than one attribute file providing home pages (to be referred to as attribute file providing address hereinafter).

Then, for the recorded piece or each of the recorded pieces of music that the user requests to purchase, the control section 20 generates an acquisition/use file 25, which stores the contents ID, the contents providing address and the attribute file providing address corresponding to the recorded piece of music that the user requests to purchase and detected from the acquisition/use information database 23 as acquisition/use information. Then, the control section 20 transmits the one or more than one acquisition/use files 25 it generates to the client terminal 2 by way of data communication processing section 24 and the portal server 4.

After transmitting the one or more than one acquisition/use files 25 to the client terminal 2 by way of the portal server 4, the control section 20 relates the one or more than one acquisition/use files 25 it has transmitted, the file name or names thereof, and the accounting ID or IDs stored in the file request data and stores and holds them in the acquisition/use information database 23.

Note that, when the control section 20 transmits the one or more than one acquisition/use files 25 to the client terminal 2, it issues a processing ID for the or each of the acquisition/use files 25 that makes the corresponding acquisition process executed by using the acquisition/use file 25 identifiable and also stores it in the acquisition/use file 25. The processing ID is also referred to as transaction ID.

Then, each time the client terminal 2 accesses an attribute file providing home page in an acquisition process, the control section, 20 has the client terminal 2 transmit the processing ID stored in the acquisition/use file 25 that is being used to the attribute information providing server 7.

Additionally, each time the client terminal 2 accesses an attribute file providing home page, the control section 20 has attribute information providing server 7 confirm the processing ID transmitted from the client terminal 2.

With this arrangement, the control section 20 prevents the client terminal 2 from accessing an attribute file providing home page twice or more than twice and consequently unduly acquire the corresponding contents attribute file twice or more than twice.

(1-3) Configuration of Contents Providing Server 6

Figure 7:
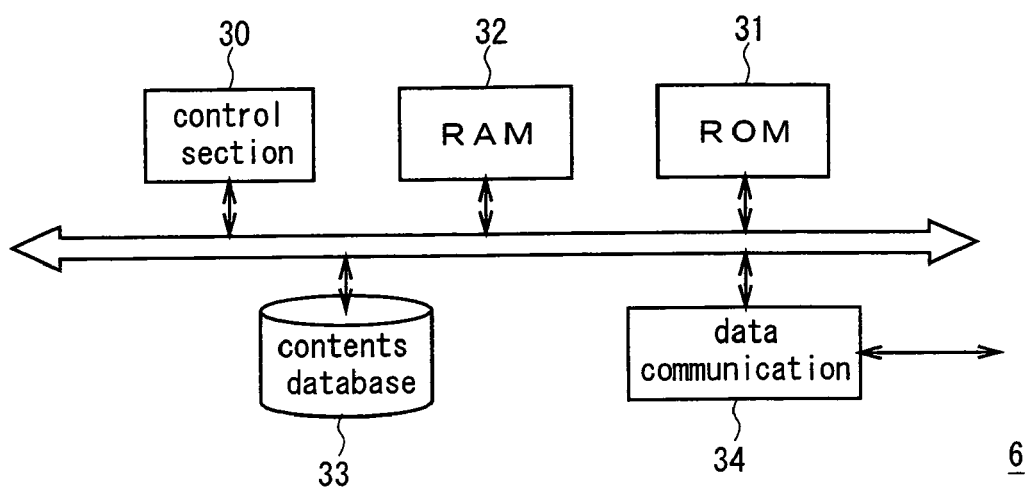
FIG. 7 is a schematic block diagram of the contents providing server, showing the circuit configuration thereof.

Referring now to FIG. 7, control section 30 comprising a CPU of the contents providing server 6 comprehensively controls the contents providing server 6 and executes various processes according to a basic program such as an OS it starts operating by way of a ROM 31 and a RAM 32 and various application programs including a contents delivery service program and so forth.

Thus, the control section 30 relates a large number of sets of contents data and respective contents IDs and stores them in a contents database 33. As the client terminal 2 accesses a contents providing home page, using the corresponding contents providing address stored in the corresponding acquisition/use file 25 and transmits contents request data that stores the contents ID in the acquisition/use file 25, the control section receives the contents request data by way of data communication processing section 34.

Then, the control section 30 detects the corresponding contents data from contents database 33 according to the contents ID stored in the contents request data. Then, the control section 30 transmits the detected contents data to the client terminal 2 by way of the data communication processing section 34.

(1-4) Configuration of Attribute Information Providing Server 7

Figure 8:
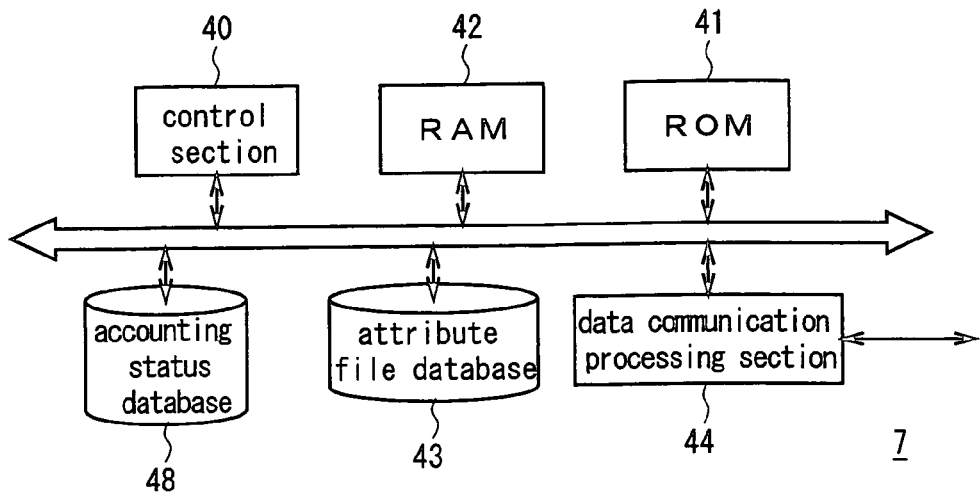
FIG. 8 is a schematic block diagram of the attribute information providing server, showing the circuit configuration thereof.

Referring now to FIG. 8, control section 40 comprising a CPU of the attribute information providing server 7 comprehensively controls the attribute information providing server 7 and executes various processes according to a basic program such as an OS it starts operating by way of a ROM 41 and a RAM 42 and various application programs including an accounting status management program and so forth.

Thus, the control section 40 relates each contents attribute file to the attribute file providing address of the corresponding attribute file providing home page for providing the contents attribute file and stores contents attribute files and corresponding attribute file providing addresses of attribute file providing home pages for providing the contents attribute files in an attribute file database 43. As the client terminal 2 accesses the attribute file providing home page according to the attribute file providing address stored in the corresponding acquisition/use file 25, the control section 40 detects the contents attribute file to be provided in the accessed attribute file providing home page from the attribute file database 43 in response to the access. Then, the control section 40 transmits the detected contents attribute file to the client terminal 2 by way of data communication processing section 44.

Figure 9:
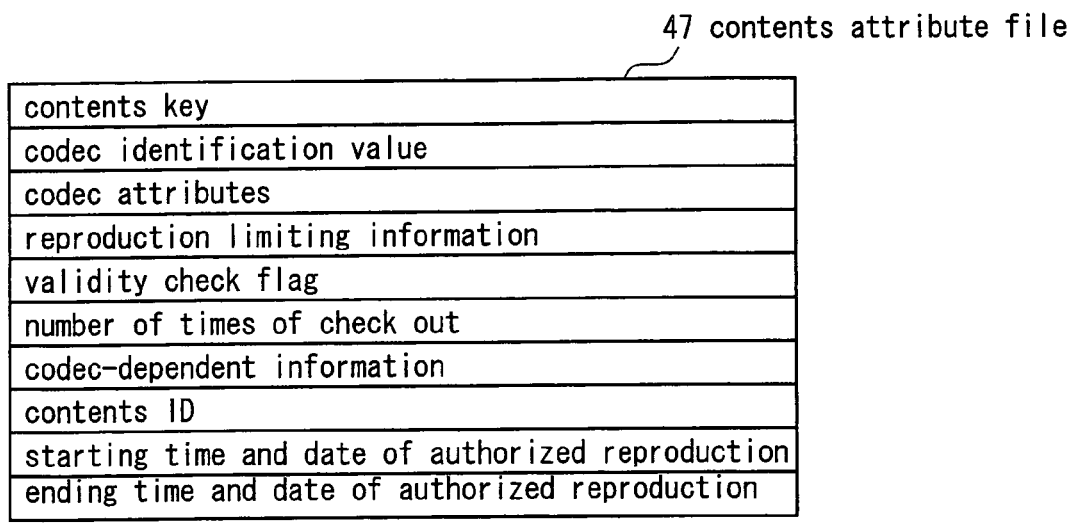
FIG. 9 is a schematic illustration of a contents attribute file, showing its configuration.

As shown in FIG. 9, the contents attribute file 47 stores as contents attribute information for altering the attributes of the corresponding contents data a contents key to be used at the client terminal 2 to decrypt the contents data, the codec identification value and the codec attributes to be referred to by the client terminal 2 to decode the contents data that are compressed/encoded by the transmitter side and decrypted by the client terminal 2, reproduction limiting information that indicates the authorized number of times of reproduction defined as right of use of the contents data, a validity check flag for checking the validity of the contents data, the so-called number of times of check out that is the number of times by which the contents data are authorized to be copied to an external recording medium from the client terminal 2, codec-dependent information, the contents ID of the corresponding contents data and information on the starting time and date and the ending time and date of authorized reproduction that indicates the time period during which the user is authorized to reproduce the contents data defined as right of use of the contents data.

Thus, as clearly seen from FIG. 9, if the client terminal 2 receives only the contents data without the contents attribute file 47 that corresponds to the contents data, the client terminal 2 can neither decrypt nor decode the contents data so that it cannot reproduce the contents data. Therefore, the control section 40 can prevent the contents data from being acquired and used fraudulently by a third party because a contents attribute file 47 that corresponds to the contents data are prepared by the control section 40.

Additionally, as the client terminal 2 accesses the attribute file providing home page of a set of contents data only once in order to give a purchase request for a single recorded piece of music or accesses the attribute file providing home page of a set of contents data for the first time in a plurality of times of accesses in order to give a purchase request for one or more than one albums containing one or more than one recorded pieces of music, the control section 40 receives the accounting ID transmitted from the client terminal 2 by way of the data communication processing section 44. Then, the control section 40 transmits accounting starting request data that store the accounting ID to the accounting server 8 by way of the data communication processing section 44 to request the accounting server 8 to start an accounting process for the user.

At the time when the attribute information providing server 7 requests the accounting server 8 to start an accounting process for the user, the accounting process has not been completed for the user as a matter of course. Therefore, when the attribute information providing server 7 requests the accounting server 8 to start an accounting process for the user, the control section 40 stores accounting status notification information indicating that the accounting process has not been completed for the user, relating it to the accounting ID it has transmitted to the accounting server 8.

Additionally, as accounting completion data are transmitted from the accounting server 8 because the accounting process is completed for the user in response to the request made to the accounting server 8 for starting an accounting process for the user, the control section 40 receives the accounting completion data by way of the data communication processing section 44. Then, the control section 40 detects the corresponding accounting status notification information out of the accounting status database 48 according to the accounting ID stored in the accounting completion data. Thereafter, the control section 40 changes the detected accounting status notification information indicating that the accounting process has not been completed yet into accounting status notification information indicating that the accounting process has been completed and then stores the changed accounting status notification information in the accounting status database 48.

Subsequently, when accounting status notification information is requested by the portal server 4 by using the accounting ID, the control section 40 reads out the accounting status notification information at the time of the request from the accounting status database 48 and transmits it to the portal server 4 by way of the data communication processing section 44.

(1-5) Configuration of Accounting Server 8

Figure 10:
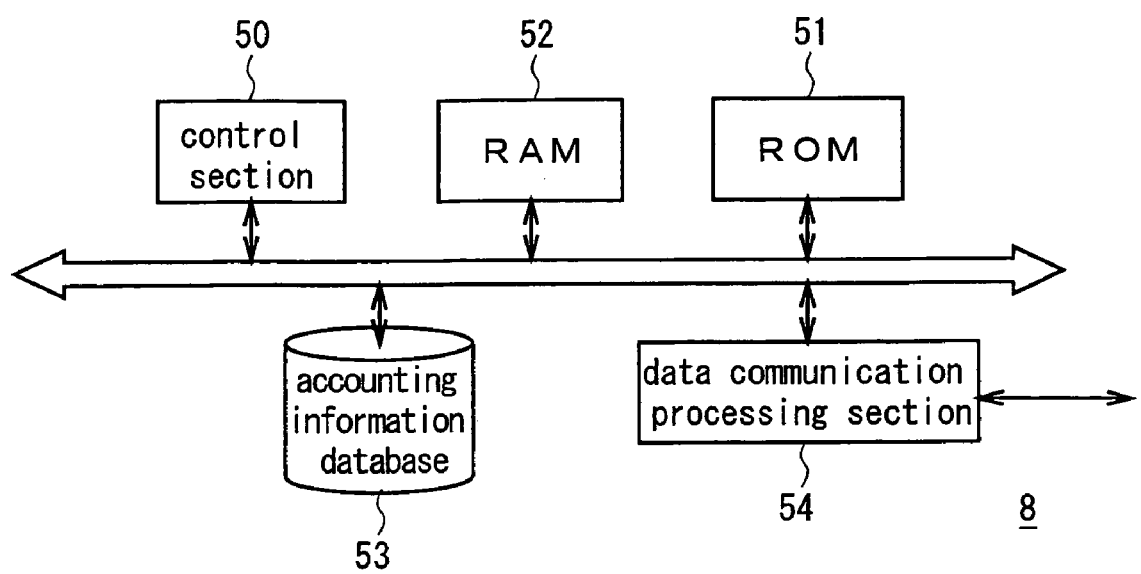
FIG. 10 is a schematic block diagram of the accounting server, showing the circuit configuration thereof.

Referring now to FIG. 10, control section 50 comprising a CPU of the accounting server 8 comprehensively controls the accounting server 8 and executes various processes according to a basic program such as an OS it starts operating by way of a ROM 51 and a RAM 52 and various application programs including an accounting program and so forth.

The control section 50 stores the user ID to be used for executing an accounting process for the user and information to be used for an accounting process such as the account number of the user and so on in an accounting information data base 53. Additionally, the control section 50 relates the contents ID to the corresponding contents data and the price information of the corresponding contents attribute file 47 and stores them in the accounting information database 53.

As the control section 50 receives the accounting ID issuance request data transmitted from the portal server 4 by way of data communication processing section 54, it issues an accounting ID in response. Then, the control section 50 transmits the accounting ID to the portal server 4 by way of the data communication processing section 54 as accounting ID data. Additionally, the control section 50 relates the accounting ID to the corresponding information to be used for an accounting process in the accounting information database 53 and stores it in the database 53.

Furthermore, when the control section 50 issues the accounting ID, it also transmits the accounting ID to the acquisition/use information providing server 5 by way of the data communication processing section 54. As a result, the control section 50 acquires the contents ID that corresponds to the recorded piece of music that the user requested to purchase from the acquisition/use information providing server 5. Then, the control section 50 detects the price information of the contents data to be purchased by the user as a recorded piece of music and the corresponding contents attribute file 47 out of the accounting information database 53 according to the contents ID it has acquired.

As the control section 50 receives the accounting starting request data transmitted from the attribute information providing server 7 by way of the data communication processing section 54 in this state, it detects the information to be used for an accounting process for the user who has requested to purchase the recorded piece of music out of the accounting information database 53 according to the accounting ID stored in the accounting starting request data. Then, the control section 50 starts an accounting process for the user, using the information to be used for an accounting process and the price information it has detected before. As the accounting process is completed, the control section 50 transmits accounting completion data that stores the accounting ID to the attribute information providing server 7 by way of the data communication processing section 54.

Note that, if the user requests to purchase a single recorded piece of music, the control section 50 executes an accounting process for the single recorded piece of music for the user at the time when a request for the accounting process is made by the attribute information providing server 7. If, on the other hand, the user requests to purchase a plurality of recorded pieces of music, the control section 50 executes a collective accounting process for all the recorded pieces of music for the user at the time when a request for the accounting process is made by the attribute information providing server 7.

(1-6) Configuration of Client Terminal 2

Figure 11:
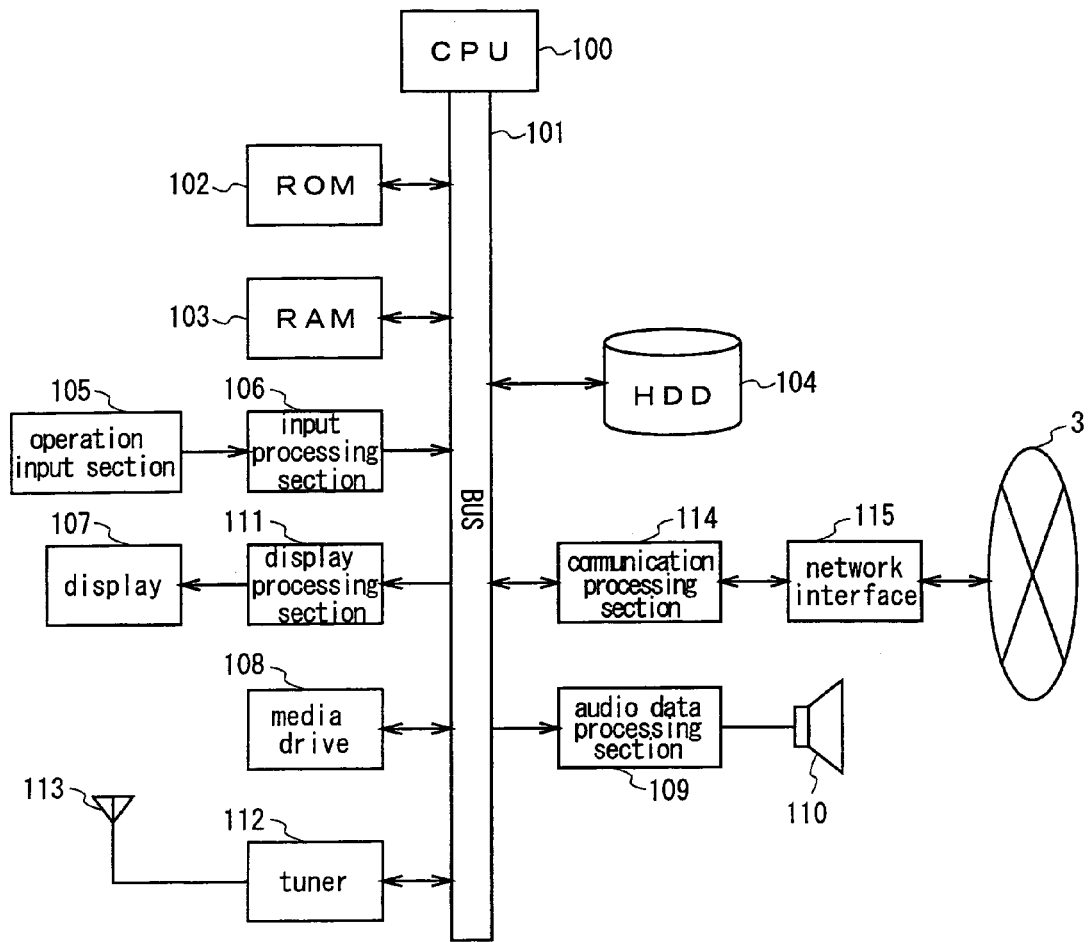
FIG. 11 is a schematic block diagram of the client terminal, showing the circuit configuration thereof.

Referring now to FIG. 11, CPU 100 of the client terminal 2 comprehensively controls the client terminal 2 and executes various processes according to a basic program such as an OS it reads out from a ROM 102 connected to it by way of a bus 101 and develops it on a RAM 103 and various application programs. Then, the CPU 100 operates for communications necessary for purchasing one or more than one recorded pieces of music and manages user input/output operations and operations of reproducing contents data from mediums and writing the contents data downloaded from a radio station and/or the contents data acquired by purchasing recorded pieces of music and the corresponding contents attribute file or files 47 in a hard disk drive (HDD) 104.

Operation input section 105 sends out input information to the input processing section 106 according to the user operation on various operation elements on the surface of the cabinet of the terminal main body and a remote controller (not shown). The input processing section 106 executes predetermined processes on the input information and sends them out to the CPU 100 as one or more than one operation commands. Then, the CPU 100 executes processes according to the operation commands.

Display 107 displays the outcome of the processes of the CPU 100 and various pieces of information. Note that the display 107 may be a liquid crystal display or some other display device directly fitted to the surface of the cabinet of the terminal main body or a display device externally fitted to the cabinet of the terminal main body.

Media drive 108 is typically a drive for operating a CD (compact disk) player and reproducing data from a Memory Stick (tradename) or the like that comprises a flash memory. The media drive 108 outputs the outcome of the reproducing operation of the CD and the Memory Stick from a 2-channel speaker 110 after executing a digital/analog conversion process on them by means of audio data processing section 109.

Note that, when the data reproduced by means of the media drive 108 are contents data of one or more than one recorded pieces of music, the CPU 100 may store them in the hard disk drive 104 as audio data file.

Additionally, the CPU 100 can read out the plurality of still pictures stored in the Memory Stick (tradename) by the media drive 108 and display them on the display 107 through the display processing section 111 as slide show.

Still additionally, the CPU 100 can randomly access a plurality of pieces of music stored in the hard disk drive 104 and output them in the sequence specified by the user so as to operate like a juke box.

Tuner section 112 is typically an AM/FM radio tuner. The tuner section 112 demodulates the broadcast signals it receives by way of an antenna 113 and outputs the outcome of the demodulation as broadcast sounds from the speaker 111 by way of audio data processing section 109 under the control of the CPU 100.

Communication processing section 114 encodes the data to be transmitted and then actually transmits them to one or more than one network-associated external apparatus (which are various servers) by way of network interface 115 and the network 3 under the control of the CPU 100. Additionally the communication processing section 114 decodes the data such as contents data received from one or more than one network-associated external apparatus (which are various servers) by way of the network interface 115 and transfers them to the CPU 100.

(1-7) Directory Management of Contents Data

Figure 12:
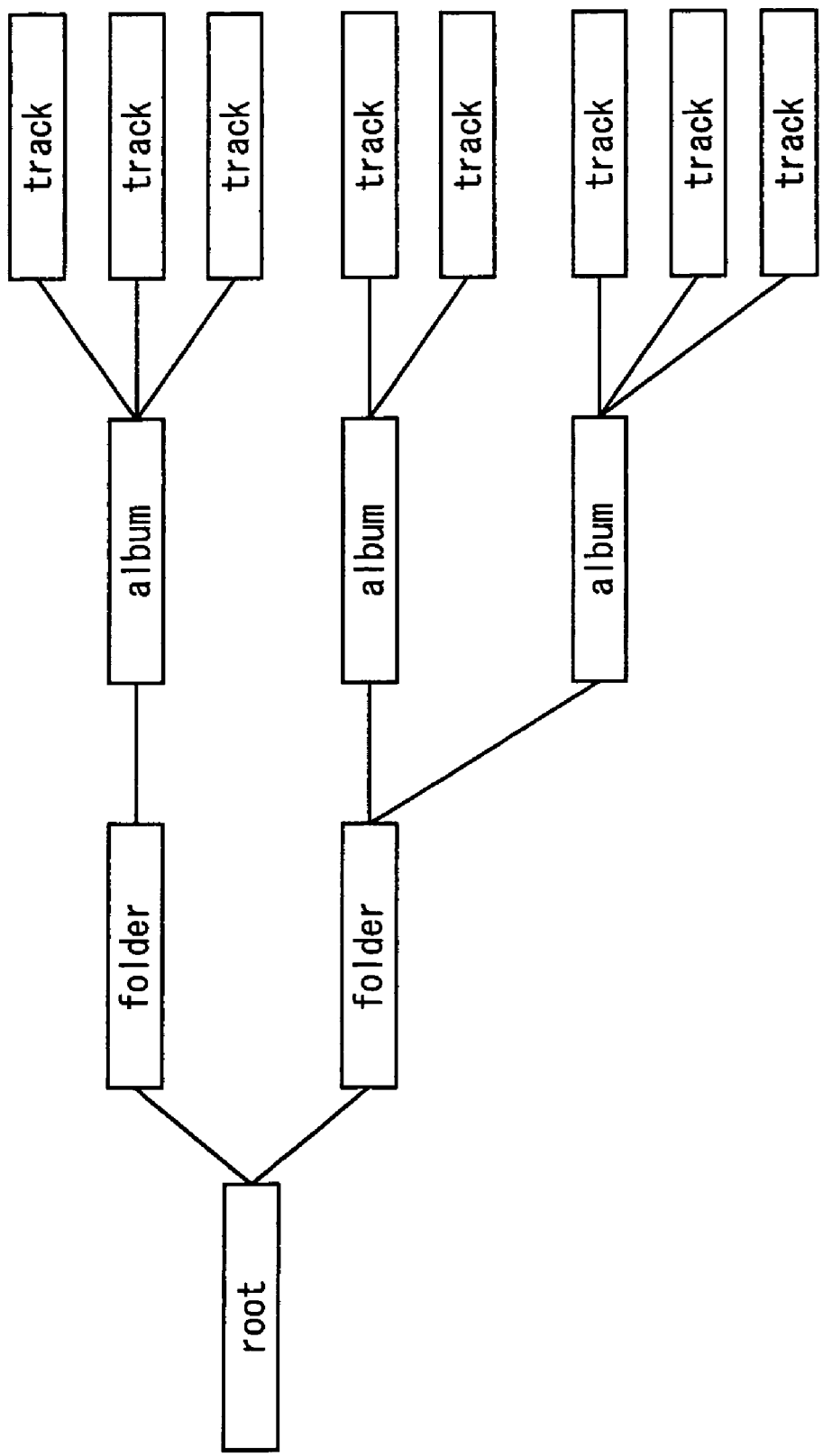
FIG. 12 is a schematic illustration of management of a directory of contents data.

The CPU 100 of the client terminal 2 manages the contents data stored in the hard disk drive 104 by means of directories as shown in FIG. 12. Referring to FIG. 12, an appropriate number of "folder" directories are prepared as lower layer directories of a "root" directory, the number of "folder" directories being within a predetermined range. The "folder" directories may typically be prepared to correspond to the genres of contents data, the users who own the contents data or the like.

An appropriate number of "album" directories are prepared as lower layer directors of each of the "folder" directories, the number of "album" directories being within a predetermined range. The "album" directories may typically be prepared to correspond to the respective album titles. One or more than one "track" files that belong to each "album" directory are stocked in the lower layers of the "album" directory. Each "track" file stores the contents data of a piece of music.

The directories of contents data are managed by the database file stored in the hard disk drive 104.

(1-8) Program Modules of Client Terminal 2

Figure 13:
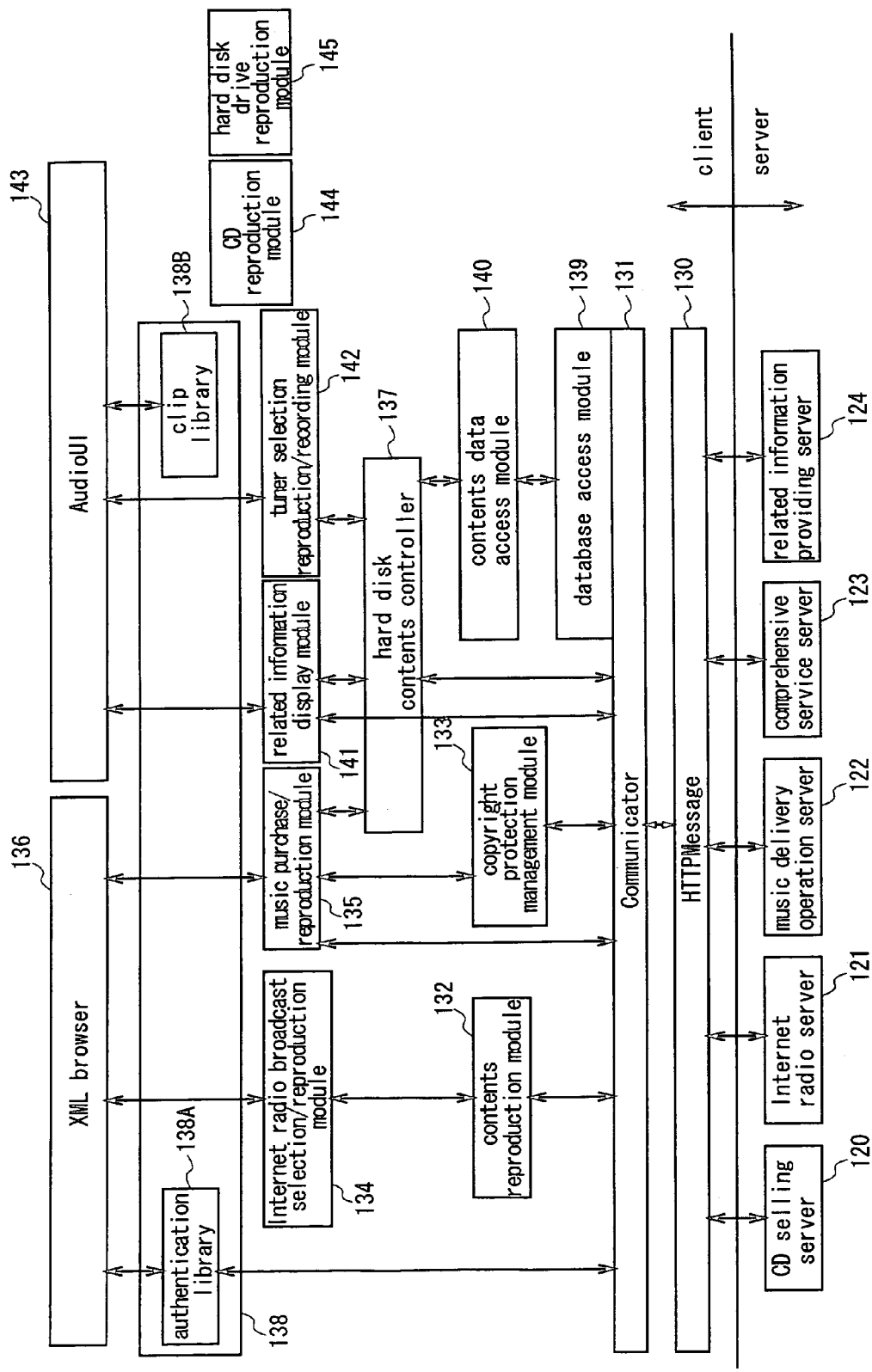
FIG. 13 is a schematic illustration of a program module installed in a client terminal.

Referring now to FIG. 13, the program modules of the client terminal 2 operate on an OS. More specifically, the client terminal 2 is adapted to exchange data with a CD selling server 120 who sells CDs, an Internet radio server 121, a music delivery operation server 122 that includes the acquisition/use information providing server 5, the contents providing server 6 and the attribute information providing server 7, which are described above, a comprehensive service server 123 that includes the portal server 4 and the accounting server 8, which are described above, a related information providing server 124 that provides music information relating to the pieces of music broadcast from radio stations to the client terminal 2 as related information and various other servers.

HTTP (Hyper Text Transfer Protocol) message program 130 is adapted to exchange data with the CD selling server 120, the Internet radio server 121, the music delivery operation server 122, the comprehensive service server 123 which performs various services comprehensively, the related information providing server 124 and various other servers by HTTP communications. Communicator program 131 is a program module for exchanging data with the HTTP message program 130.

Contents reproduction module 132 that interprets the codec of contents data and reproduces the contents data and copyright protection information management module 133 that handles information relating to protection of copyright such as right of utilization are arranged as higher order modules relative to the communicator program 131.

Internet radio broadcast selection/reproduction module 134 for selecting an Internet radio broadcast and reproducing one or more than one recorded pieces of music and music purchase/reproduction module 135 for purchasing and reproducing one or more than one recorded pieces of music according to the contents of the contents attribute file or files 47 thereof are arranged respectively as higher order modules relative to the contents reproduction module 132 and the copyright protection information management module 133.

XML (extensible markup language) browser 136 is arranged at a position higher than the Internet radio broadcast selection/reproduction module 134 and the music purchase/reproduction module 135. Then, the XML browser 136 interprets the XML files (e.g., accounting status notification image data as described above) from various servers and displays images on the display 107.

For example, as for a recorded piece of music that is selected for purchasing by the user through the XML browser 136, the corresponding acquisition/use file 25 is acquired by the music purchase/reproduction module 135. Subsequently, the recorded piece of music is acquired by the music purchase/reproduction module 135 and the copyright protection information management module 133 as contents data and a contents attribute file 47 and written into the hard disk drive 104 by way of hard disk contents controller 137.

Note that the communicator program 131 is connected to authentication library 138A of library 138. The library 138 executes various authentication processes for the comprehensive service server 123 and various other servers by means of the authentication library 138A.

Additionally, database access module 139, contents data access module 140 and hard disk contents controller 137 are arranged as higher order modules relative to the communicator program 131.

The database access module 139 accesses various databases build in the hard disk drive 104. The contents data access module 140 accesses the contents data and the contents attribute files 47 stored in the hard disk drive 104. The hard disk contents controller 137 manages the contents data and the contents attribute files 47 stored in the hard disk drive 104.

Related information display module 141 for displaying the titles of the pieces of music that a radio station has broadcast and the names of the performing artists and a tuner station selection reproduction/recording module 142 for tuning in a radio station and recording the contents data of the pieces of music received from the radio station in the hard disk drive 104 are arranged as higher order module relative to the hard disk contents controller 137.

For instance, the pieces of music that are received from the selected radio station by way of audio user interface 143 are written into the hard disk drive 104 by way of the contents data access module 140.

The related information display module 141 receives the title and the names of the performing artists of the piece of music that is being broadcast by the radio station selected by tuner selection reproduction/recording module 142 from the related information providing server 124 by way of the HTTP message 130 and displays them on the display 107 by way of audio user interface (UI) 143.

Note that the related information that is displayed on the display 107 by way of the audio user interface 143 may be temporarily stored in the clip library 138B of the library 138. Ultimately, it is stored in the hard disk drive 104 by way of the data base access module 139 according to the instructions given by the user.

The program modules of the client terminal 2 additionally include a CD replay module 144 for replaying CDs and an HDD reproduction module 145 for reproducing data from the hard disk drive 104. The CD replay module 144 and the HDD reproduction module 145 output what they respectively reproduce from a CD and the hard disk drive 104 by way of the audio data processing section 109 and the speaker 110.

(2) Music Purchasing Process Sequence (2-1) First Music Purchasing Process Sequence Now, the sequence of a music purchasing process that the client terminal 2 and the various servers execute in response to a request for purchasing the recorded pieces of music from the user will be described below by referring to the sequence charts of FIGS. 14 through 18.

The sequence of the music purchasing process as described below include the sequence of the music purchasing process that is used when the client terminal 2 is operating properly (to be referred to as normal music purchasing process sequence hereinafter) and the sequence of the music purchasing process that is used when the client terminal 2 resumes an interrupted acquisition process (to be referred to as resumed music purchasing process sequence hereinafter).

Thus, the normal music purchasing process sequence and the resumed music purchasing process sequence will be described below sequentially.

(2-1-1) Normal Music Purchasing Process Sequence

Figure 14:
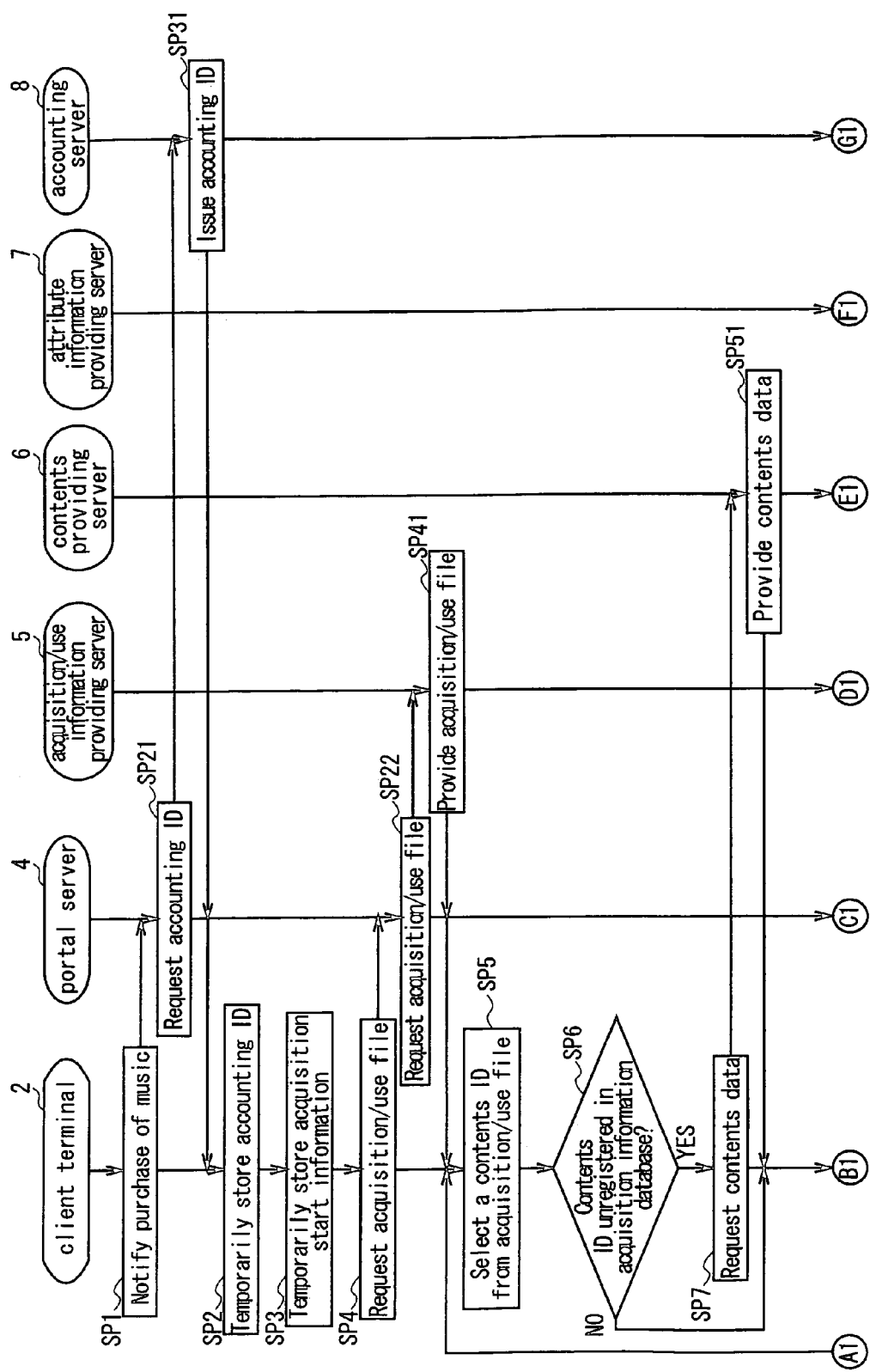
FIG. 14 is a schematic illustration of a sequence of purchasing a recorded piece of music (1) when a client terminal is operating properly.
Figure 15:
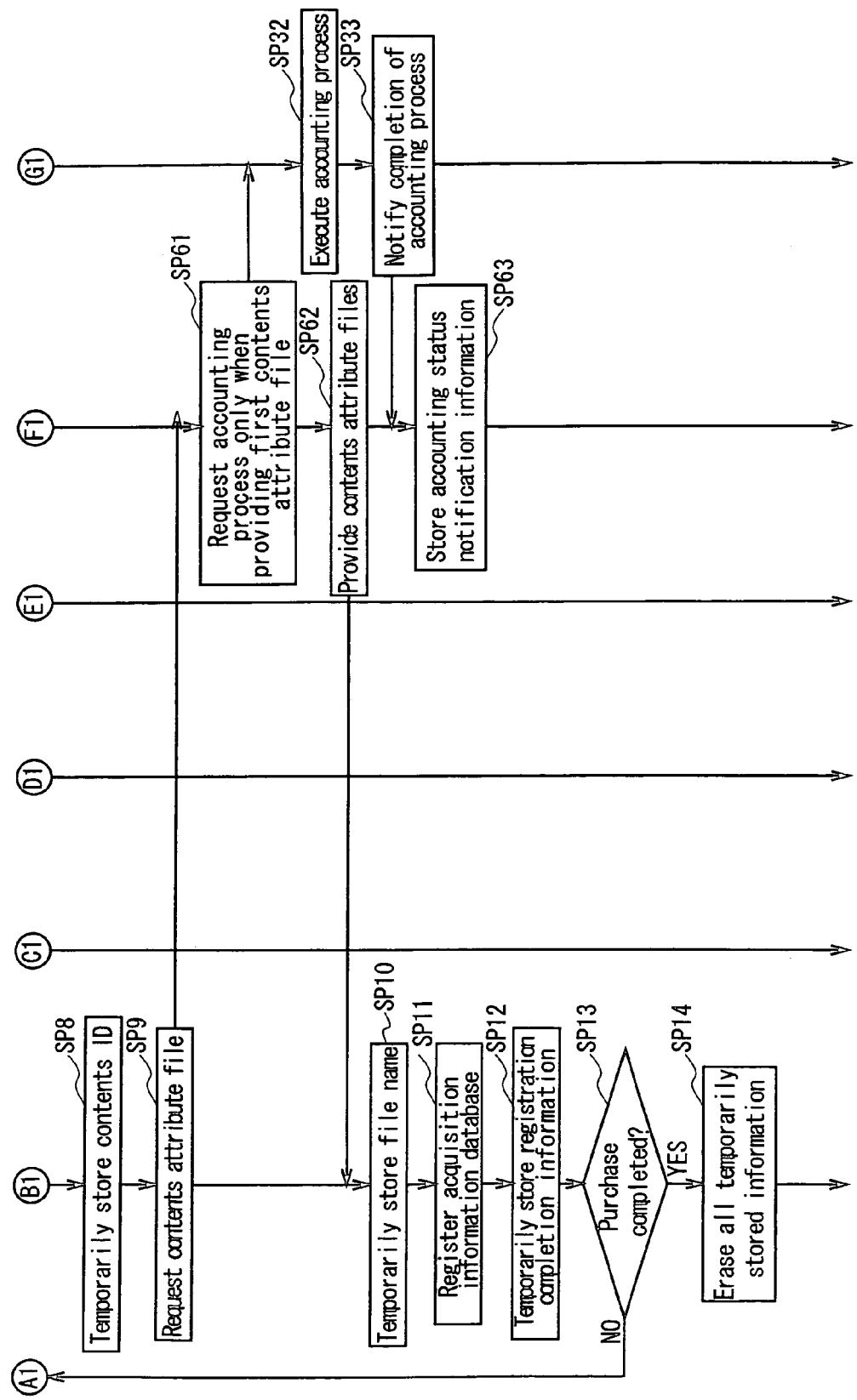
FIG. 15 is a schematic illustration of another sequence of purchasing a recorded piece of music (12) when a client terminal is operating properly.

Referring now to FIGS. 14 and 15, in Step SP1, the client terminal 2 generates music purchase request data that stores the user ID and the password of the user and the contents ID or IDs of the recorded piece or recorded pieces, whichever appropriate, of music that the user requests to purchase. Then, the client terminal 2 transmits the music purchase request data to the portal server 4 and then moves to the next step, or Step SP2.

In Step SP21, the portal server 4 personally authenticates the user according to the music purchase request data transmitted from the client terminal 2 and requests the accounting server 8 to issue an accounting ID that is necessary for identifying the accounting process for the user and then moves to the next step, or Step SP22.

In Step S31, the accounting server 8 issues an accounting ID in response to the request for issuance of an accounting ID from the portal server 4. Then, the accounting server 8 transmits the accounting ID to the client terminal 2 by way of the portal server 4 and moves to the next step, or Step SP32.

In Step SP2, the client terminal 2 receives the accounting ID by way of the portal server 4 and temporarily stores the received accounting ID in the hard disk of the hard disk drive 104 as process progress information indicating the progress of an acquisition process before it moves to the next step, or Step SP3.

In Step SP3, as the purchase of the recorded piece or pieces of music is confirmed by the user on a predetermined image displayed at the client terminal 2, the client terminal 2 stores acquisition start information that indicates the start of the acquisition process that corresponds to the music purchase request as progress information indicating a progress of acquisition process in the hard disk of the hard disk drive 104 and moves to the next step, or Step SP4.

In Step SP4, the client terminal 2 generates acquisition/use information request data that store the user ID and the accounting ID and transmits them to the portal server 4 before it moves to the next step, or Step SP4.

At this time, in Step SP22, the portal server 4 generates file request data that store the accounting ID and the contents ID or IDS corresponding to the recorded piece or pieces, whichever appropriate, of music that the user requests to purchase in response to the acquisition/use information request data transmitted from the client terminal 2 and transmits them to the acquisition/use information providing server 5.

As a result, in Step SP41, the acquisition/use information providing server 5 generates one or more than one acquisition/use files 25 according to the file request data transmitted from the portal server 4. Then, the acquisition/use information providing server 5 transmits the one or more than one acquisition/use files 25 to the client terminal 2 by way of the portal server 4. Additionally, the acquisition/use information providing server 5 relates the accounting ID stored in the file request data to the one or more than one acquisition/use files 25 it transmits to the client terminal 2 and stores them in the acquisition/use information database 23.

Then, in Step SP5, the client terminal 2 temporarily stores the one or more than one acquisition/use files 25 it receives from the acquisition/use information providing server 5 by way of the portal server 4 in the hard disk. Additionally, from the acquisition/use file 25, the client terminal 2 selects one of the contents IDs of the contents data for which it requests the contents providing server 6 as request contents ID indicating the request for the contents data and moves to the next step, or Step SP6.

By this time, the client terminal 2 has prepared an "album" directory, which is described above by referring to FIG. 12, for storing/managing the contents data and the one or more than one contents attribute files 47 it acquires in response to the music purchase request.

Additionally, each time the client terminal 2 acquires contents data and a corresponding contents attribute file 47 for the recorded piece of music to be purchased, it relates the title of the recorded piece of music, the corresponding contents ID, the title of the "album" directory and the memory address on the hard disk for the contents data and the corresponding contents attribute file 47 to each other and stores them for a database. In this way, it builds an acquisition information database.

Then, in Step SP6, the client terminal 2 browses the inside of the acquisition information database by referring to the single request contents ID selected in Step SP5 and determines if the request contents ID is unregistered in the acquisition information database or not.

If the outcome of Step SP6 is positive, it means that the single request contents ID selected in Step SP5 is unregistered in the acquisition information database of the hard disk. In other words, it means that the contents data that corresponds to the request contents ID are acquired for the first time by the acquisition process corresponding to the current music purchase request. Then, therefore, the client terminal 2 moves to the next step, or Step SP7.

In Step SP7, the client terminal 2 selects the contents providing address that corresponds to the request contents ID selected in Step SP5 out of the acquisition/use file 25. Then, the client terminal 2 accesses the contents providing home page according to the selected contents providing address and transmits the contents request data that stores the request contents ID to the contents providing server 6 in this state before it moves to the next step, or Step SP8.

At this time, in Step SP51, the contents providing server 6 transmits the contents data specified by the request contents ID to the client terminal 2 in response to the request from the client terminal 2.

If the output of Step SP6 is negative, it means that the request contents ID selected in Step SP5 is already registered in the acquisition information database of the hard disk. In other words, it means that the contents data that corresponds to the request contents ID have already been acquired before the current acquisition process corresponding to the request contents ID. Then, therefore, the client terminal 2 copies the contents data that have already been acquired as "track" file to be managed by the "album" directory that is prepared as a result of the current acquisition process and subsequently it moves to the next step, or Step SP8.

In Step SP8, the client terminal 2 reduces the contents ID of the contents data (which is the request contents ID selected out of the acquisition/use file 25) into stored contents ID to indicate that the contents data are already stored at the time when the reception of the contents data transmitted from the contents providing server 6 or when the contents data are copied as "track" file. Then, the client terminal 2 also temporarily stores the stored contents ID in the hard disk as process progress information indicating the progress of the acquisition process and moves to the next step, or Step SP9.

In Step SP9, the client terminal 2 selects the attribute file providing address that corresponds to the request contents ID selected in Step SP5 out of the acquisition/use file 25 as attribute request information, for requesting the contents attribute file 47. Then, the client terminal 2 accesses the attribute file providing home page according to the selected attribute file providing address and then moves to the next step, or Step SP10.

At this time, in Step SP61, in response to the access of the client terminal 2 to the attribute file providing home page, the attribute information providing server 7 transmits accounting starting request data to the accounting server 8 and requests to start an accounting process for the user who requested to purchase the recorded piece of music if the access is the first access in the acquisition process being executed in response to the current music purchase request. Additionally, the attribute information providing server 7 stores accounting status notification information indicating that the accounting process corresponding to the accounting ID has not been completed in the accounting status database 48, relating it to the accounting ID transmitted from the client terminal 2, and moves to the next step, or Step SP62.

Then, in Step SP62, the attribute information providing server 7 transmits the contents attribute file 47 that corresponds to the attribute file providing home page accessed by the client terminal 2 to the client terminal 2 and moves to the next step, or Step SP63.

At this time, in Step SP32, the accounting server 8 starts an accounting process for the user who requested to purchase the recorded piece of music in response to the request for starting an accounting process from the attribute information providing server 7. When the accounting process is completed, the accounting server 8 transmits accounting completion data to the attribute information providing server 7 in the next step, or Step SP33.

Thus, in Step SP63, the attribute information providing server 7 replaces the accounting status notification information stored in the accounting status database 48 to indicate that the accounting process has not been completed with accounting status notification information indicating that the accounting process has been completed according to the accounting completion data transmitted from the accounting server 8.

On the other hand, in Step SP10, the client terminal 2 receives the contents attribute file 47 transmitted from the attribute information providing server 7. When the reception is completed, the client terminal 2 temporarily stores the file name of the contents attribute file 47 in the hard disk as process progress information indicating the progress of the acquisition process and moves to the next step, or Step SP11.

In Step SP11, the client terminal 2 relates the request contents ID it selected in Step SP5 to the memory address on the hard disk for the contents data and the contents attribute file 47 it acquired according to the request contents ID and registers them in the acquisition information database of the hard disk as registration information before it moves to the next step, or Step SP12.

In Step SP12, the client terminal 2 temporarily stores registration completion information indicating the completion of registration of the registration information in the acquisition information database as process progress information indicating the progress of the acquisition process and moves to the next step, or Step SP13.

In Step SP13, the client terminal 2 determines if it has acquired all the contents data and the contents attribute files 47 corresponding to the more than one recorded pieces of music currently requested for purchasing or not (in other words, if all the pieces of music requested for purchasing have been purchased or not).

If the answer to the question in Step SP13 is negative, it means that all the contents data and the contents attribute files 47 that correspond to the plurality of recorded pieces of music currently requested for purchasing by the user have not been acquired, while the user requested to collectively purchase the plurality of recorded pieces of music in the album. Therefore, the client terminal 2 returns to Step SP5 to recurrently repeat the processing operations from Step SP5 to Step SP13 until the answer to the question in Step SP13 becomes positive. Thus, in this way, the client terminal 2 sequentially acquires the contents data and the contents attribute files 47 corresponding to the recorded pieces of music that the user requested to purchase from the contents providing server 6 and the attribute information providing server 7.

If the answer to the question in Step SP13 becomes positive, it means that client terminal 2 has acquired the contents data and the contents attribute file or files 47 that correspond to the recorded piece of music or all the recorded pieces of music, whichever appropriate, that the user requested to purchase this time. Then, therefore, the client terminal 2 moves to the next step, or Step SP14.

In Step SP14, the client terminal 2 erases all the pieces of process progress information it has temporarily and sequentially stored in the hard disk typically in the form of log files, while it has been executing the acquisition process to end the acquisition process.

(2-1-2) Resumed Music Purchasing Process Sequence

There may be occasions where the power supply to the client terminal 2 is suspended because, for example, the user inadvertently pulls out the plug of the power supply cord or that of the network cable of the client terminal 2. Then, the communication line between the client terminal 2 and the network 3 is temporarily disconnected and the above described acquisition process maybe interrupted. Therefore, the resumed music purchasing process sequence to be followed when the communication line connecting the client terminal 2 is restored from a disconnection will be described below.

Figure 16:
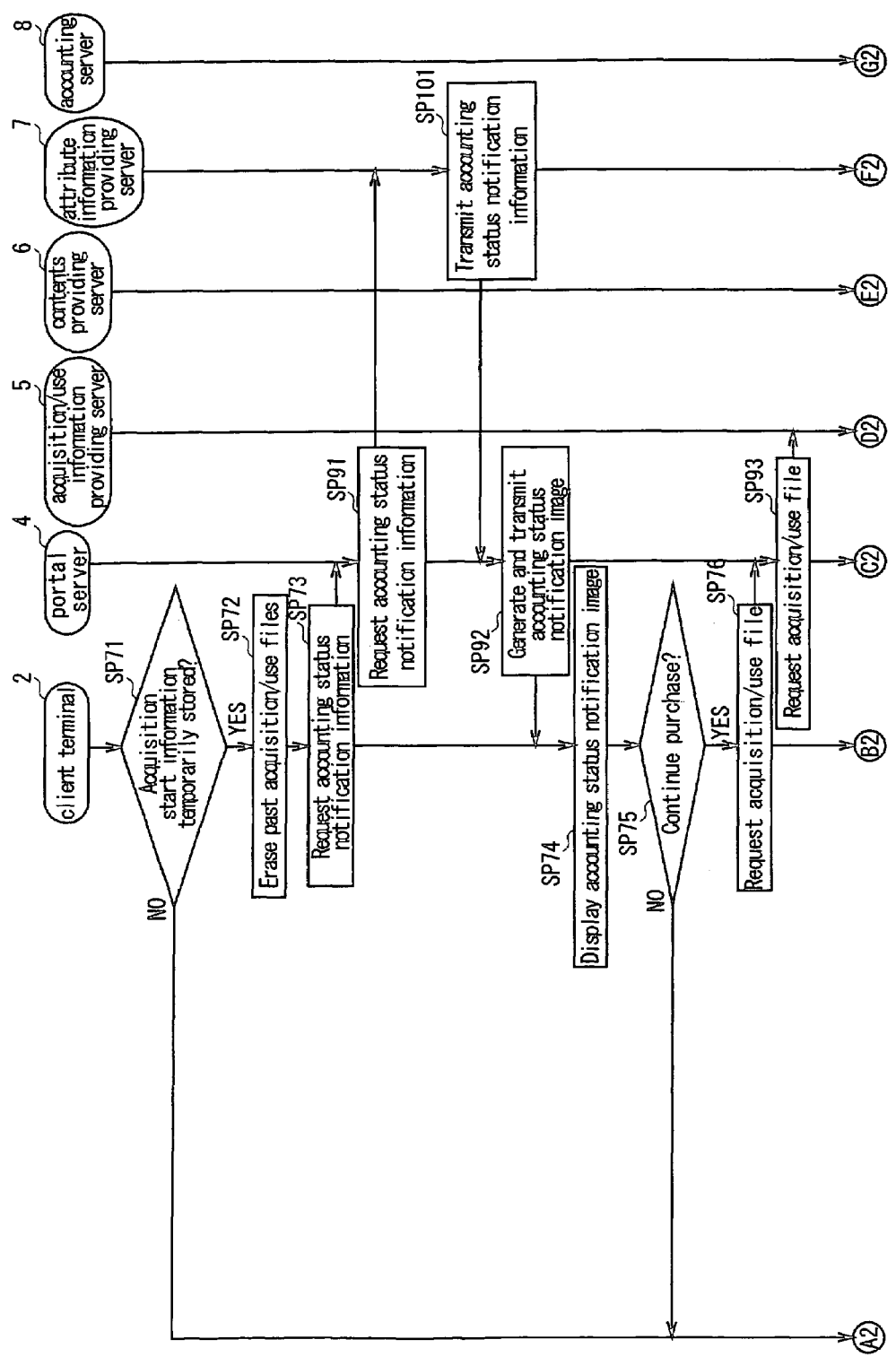
FIG. 16 is a schematic illustration of a sequence of purchasing a recorded piece of music (1) when the communication line of a client terminal is restored from a disconnection.
Figure 17:
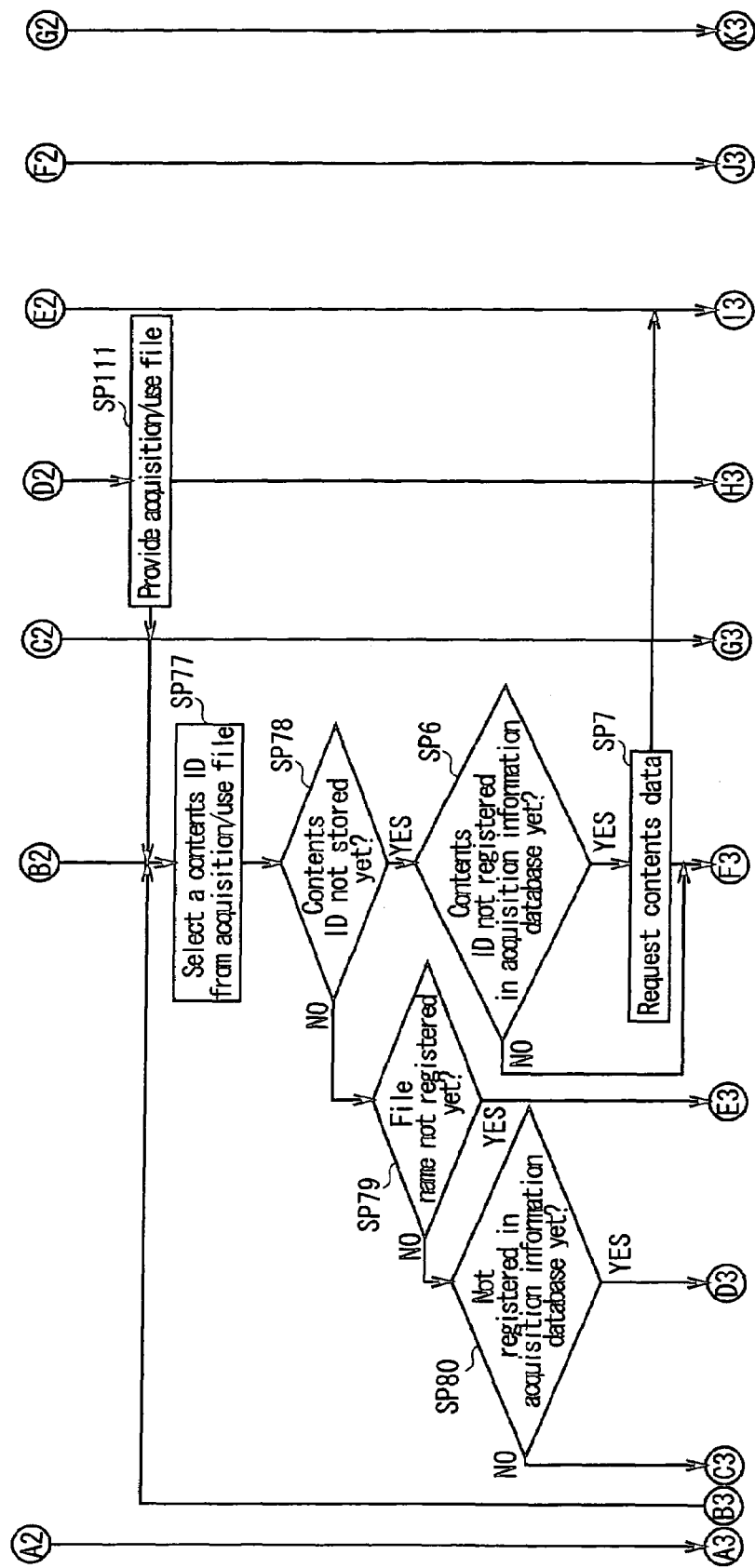
FIG. 17 is a schematic illustration of another sequence of purchasing a recorded piece of music (2) when the communication line of a client terminal is restored from a disconnection.
Figure 18:
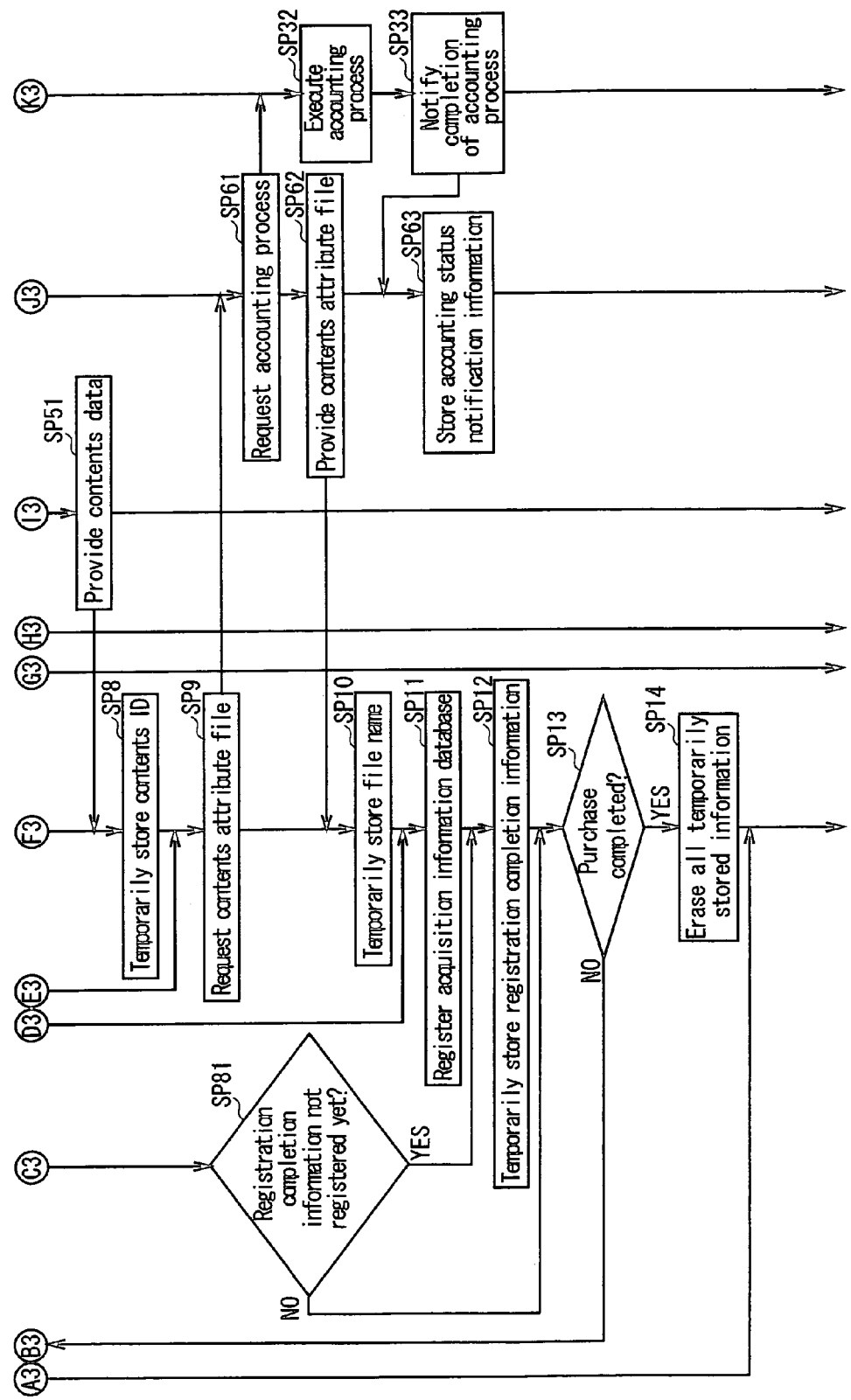
FIG. 18 is a schematic illustration of still another sequence of purchasing a recorded piece of music (3) when the communication line of a client terminal is restored from a disconnection.

Referring to FIGS. 16 through 18, in which the components same as or similar to those of FIGS. 14 and 15 are denoted respectively by the same reference symbols, the client terminal 2 determines if the acquisition start information that it temporarily stores in the hard disk of the hard disk drive 104 as process progress information is still left or not in Step SP71.

If the answer to the question in Step SP71 is negative, it means that the communication line from the client terminal 2 to the network 3 is disconnected while the client terminal 2 is not executing any acquisition process corresponding to the music purchase request and hence no acquisition start information is left in the hard disk as process progress information. Therefore, the client terminal 2 subsequently waits for a music purchase request made by the user.

If, on the other hand, the answer to the question in Step SP71 is positive, it means that the plug of the power supply cord or that of the network cable of the client terminal 2 is pulled out while the client terminal 2 is executing a process that corresponds to a music purchase request and hence the communication line from the client terminal 2 to the network 3 is disconnected so that consequently the acquisition process is interrupted and the acquisition start information that is temporarily stored in the hard disk as process progress information is still left there. Therefore, the client terminal 2 then resumes the acquisition process and moves to the next step, or Step SP72.

Note that the client terminal 2 temporarily stores the acquisition/use file 25 it acquired from the acquisition/use information providing server 5 in the hard disk for the interrupted acquisition process. However, the described contents of the acquisition/use file 25 may have been altered particularly in terms of the contents providing address and/or the attribute file providing address for the sake of the firm that is managing and running the contents providing server 6 and the attribute information providing server 7 while the acquisition process is interrupted at the client terminal 2.

In view of such a possible situation, in Step SP72, the client terminal 2 erases the acquisition/use file 25 it was using for the interrupted acquisition process and then moves to the next step, or Step SP73.

In Step SP73, the client terminal 2 generates the accounting status notification request data that contain the accounting ID it had temporarily stored in the hard disk as process progress information until the time when the acquisition process is interrupted along with the user ID and the password of the user and transmits them to the portal server 4 before it moves to the next step, or Step SP74.

At this time, in Step SP91, the portal server 4 personally authenticates the user according to the user ID and the password stored in the accounting status notification request data transmitted from the client terminal 2 and subsequently requests accounting status notification information of the accounting process that corresponds to the accounting ID from the attribute information providing server 7, using the accounting ID stored in the accounting status notification request data, before it moves to the next step, or Step SP92.

In Step SP101, the attribute information providing server 7 responds to the request for accounting status notification information from the portal server 4 and detects corresponding accounting status notification information from the accounting status database 48 according to the accounting ID it obtained with the request. Then, the attribute information providing server 7 transmits the detected accounting status notification information to the portal server 4 and moves to the next step, or Step SP32.

As a result, in Step SP92, the portal server 4 receives the accounting status notification information transmitted from the attribute information providing server 7. Then, the portal server 4 generates an accounting status notification image 15 or 16 as described above by referring to FIGS. 3 and 4 depending on the contents of the accounting status notification information. Then, the portal server 4 transmits the accounting status notification image 15 or 16, whichever appropriate, it generates to the client terminal 2 as accounting status notification image data and moves to the next step, or Step SP93.

In Step SP74, the client terminal 2 receives the accounting status notification image data transmitted from the portal server 4. Then, the client terminal 2 displays the accounting status notification image 15 or 16, whichever appropriate, formed on the basis of the accounting status notification image data and moves to the next step, or Step SP75.

In Step SP75, the client terminal 2 decides if it continues the resumed acquisition process (to be referred to as resumed acquisition process hereinafter) or not, while displaying the accounting status notification image 15 or 16, whichever appropriate.

If the answer to the question in Step SP75 is negative, it means that it had not acquired any contents attribute file 47 by the time when the acquisition process is interrupted last time nor any accounting process had been completed so that the purchasing process is terminated on the accounting status notification image 16 and, if the user still wants to purchase the contents data, he or she has to purchase them sometime later. Thus, the client terminal 2 ends the resumed acquisition process at this time.

If, on the other hand, the answer to the question in Step SP75 is positive, it means that it had acquired one or more than one contents attribute files 47 by the time when the acquisition process is interrupted, although the acquired one or more than one contents attribute files may not be those of all the recorded pieces of music that the user wants to purchase, and the accounting process had already been completed or no contents attribute file 47 had been acquired by the time when the acquisition process is interrupted but the accounting process had already been completed so that continuation of the purchasing process is selected on the accounting status notification image 15 or 16 until all the recorded pieces of music that the user requested to purchase are actually purchased. Therefore, the client terminal 2 then moves to the next step, or Step SP76.

In Step SP76, the client terminal 2 generates anew the acquisition/use information request data that store the user ID, the password and the accounting ID and transmits them to the portal server 4. Then, it moves to the next step, or Step SP77.

At this time, in Step SP93, the portal server 4 detects the file name of the acquisition/use file 25 it was providing to the client terminal 2 during the acquisition process that was interrupted last time from the user database according to the accounting ID stored in the acquisition/use information request data transmitted from the client terminal 2. Then, the portal server 4 transmits the file name and the accounting ID to the acquisition/use information providing server 5 and requests the acquisition/use file 25.

In Step SP111, the acquisition/use information providing server 5 retrieves the acquisition/use file 25 that it was providing to the client terminal 2 by way of the portal server 4 during the acquisition process that was interrupted last time from the acquisition/use information database 23 according to the accounting ID and the file name transmitted from the portal server 4. Then, if the contents providing address and/or the attribute file providing address described in the contents of the retrieved acquisition/use file 25 need to be corrected, the acquisition/use information providing server 5 corrects the description of the acquisition/use file 25 and transmits the corrected acquisition/use file 25 to the client terminal 2 by way of the portal server 4. If, on the other hand, the contents providing address and/or the attribute file providing address described in the contents of the description of the retrieved acquisition/use file 25 do not need to be corrected, the acquisition/use information providing server 5 transmits the acquisition/use file 25 to the client terminal 2 by way of the portal server 4 without correcting it.

Then, in Step SP77, the client terminal 2 temporarily stores the acquisition/use file 25 it received anew from the acquisition/use information providing server 5 by way of the portal server 4 in the hard disk. Additionally, the client terminal 2 selects a request contents ID from the acquisition/use file 25 and moves to the next step, or Step SP78.

In Step SP78, the client terminal 2 determines if the request contents ID it selects from the acquisition/use file 25 has been stored in the hard disk as process progress information (and hence as stored contents ID) or not.

If the answer to the question in Step SP78 is positive, it means that the request contents ID selected in Step SP77 has not been stored in the hard disk as process progress information (and hence as stored contents ID). In other words, the positive result indicates that client terminal 2 had not acquired the contents data that correspond to the request contents ID when the acquisition process was interrupted last time from the contents providing server 6. Then, the client terminal 2 moves to Step SP6.

In Step SP6, the client terminal 2 browses the inside of the acquisition information database by referring to the request contents ID selected from the acquisition/use file 25 and determines if the request contents ID is unregistered in the acquisition information database or not.

If the outcome of Step SP6 is positive, it means that the request contents ID selected from the acquisition/use file 25 is unregistered in the acquisition information database of the hard disk. In other words, it means that the contents data that corresponds to the request contents ID are acquired for the first time by the resumed acquisition process corresponding to the request contents ID. Then, therefore, the client terminal 2 moves to the next step, or Step SP7.

Then, the client terminal 2 acquires the contents data and the contents attribute file 47 of one of the recorded pieces of music that the user requested to purchase and repeats the acquisition process by executing processing operations of Steps SP7 through SP14 of the music purchasing sequence described earlier by referring to FIGS. 14 and 15.

If, on the other hand, the answer to the question in Step SP78 is negative, it means that the request contents ID selected in Step SP77 is temporarily stored in the hard disk as process progress information (and hence as stored contents ID). In other words, the negative result indicates that client terminal 2 had already acquired the contents data that correspond to the request contents ID when the acquisition process was interrupted last time from the contents providing server 6. Then, the client terminal 2 moves to the next step, or Step SP79.

In Step S79, the client terminal 2 determines if the file name of the contents attribute file 47 that corresponds to the request contents ID selected in Step SP77 has been stored in the hard disk as process progress information or not.

If the answer to the question in Step SP79 is positive, it means that the file name of the contents attribute file 47 that corresponds to the request contents ID selected in Step SP77 has not been temporarily stored as process progress information in the hard disk yet. In other words, the positive result indicates that the client terminal 2 had not acquired the contents attribute file 47 that corresponds to the request contents ID from the attribute information providing server 7 when the acquisition process was interrupted last time. Then, the client terminal 2 moves to Step SP9, where it acquires only the contents attribute file 47 that corresponds to the request contents ID without acquiring the contents data that correspond to the request contents ID.

If, on the other hand, the answer to the question in Step SP79 is negative, it means that the file name of the contents attribute file 47 that corresponds to the request contents ID selected in Step SP77 has already been temporarily stored in the hard disk as process progress information. In other words, the positive result indicates that the client terminal 2 had already acquired both the contents data and the contents attribute file 47 that correspond to the request contents ID when the acquisition process was interrupted last time. Then, the client terminal 2 moves to the next step, or Step SP80.

In Step SP80, the client terminal 2 determines if the registration information that corresponds to the request contents ID selected in the Step SP77 is unregistered in the acquisition information database in the hard disk or not.

If the outcome of Step SP80 is positive, it means that the client terminal 2 had sequentially acquired the contents data and the contents attribute file 47 that corresponds to the request contents ID selected in Step SP77 by the time when the acquisition process was interrupted last time but the acquisition process had been interrupted immediately before it registered the registration information that corresponds to the request contents ID selected in Step SP77 in the acquisition information database in the hard disk. Then, the client terminal 2 moves to Step SP11, where it registers the registration information in the acquisition information database.

If, on the other hand, the outcome of Step SP80 is negative, it means that the client terminal 2 had already registered the registration information that corresponds to the request contents ID selected in Step SP77 in the acquisition information database by the time when the acquisition process was interrupted last time. Then, the client terminal 2 moves to the next step, or Step SP81.

In Step SP81, the client terminal determines if the registration completion information that indicates that the process of registering the registration information corresponding to the request contents ID selected in Step SP77 has been completed is stored as process progress information or not.

If the answer to the question in Step SP81 is positive, it means that the last acquisition process had been interrupted when the registration completion information that indicates the completion of the process of registering the registration information corresponding to the request contents ID selected in Step SP77 as process progress information was tried to be stored in the hard disk. Then, the client terminal 2 moves to Step SP12, where it temporarily stores the registration completion information in the hard disk as process progress information.

If, on the other hand, the answer to the question in Step SP81 is positive, it means that the registration completion information that indicates the completion of the process of registering the registration information corresponding to the request contents ID selected in Step SP77 had already been stored in the hard disk as process progress information when the acquisition process was interrupted last time. Then, the client terminal 2 moves to Step SP13, where it determines if there are contents data and one or more than one contents attribute files 47 to be acquired or not according to the description of the acquisition process file 25 it acquired anew from the acquisition/use information providing server 5.

In this way, when an acquisition process is resumed after a temporary interruption, the client terminal 2 avoids acquiring the contents data and the contents attribute file or files 47 that correspond to the one or more than one recorded pieces of music to be purchased in duplicate before and after the interruption of the acquisition process. With this arrangement, the client terminal 2 can efficiently acquire the contents data and the contents attribute file or files 47 that correspond to the one or more than one recorded pieces of music to be purchased.

(2-2) Second Music Purchasing Process Sequence

Now, the sequence of another music purchasing process will be described below by referring to the sequence charts of FIGS. 19 through 22, this process being different from the above described one.

The sequence of the music purchasing process as described below includes the sequence of the normal music purchasing process that is used when the client terminal 2 is operating properly and the sequence of the music purchasing process that is used when the client terminal 2 retries to acquire data when the client terminal 2 is restored from an interrupted acquisition process (to be referred to as retry music purchasing process sequence hereinafter).

Thus, the normal music purchasing process sequence and the retry music purchasing process sequence will be described below sequentially.

Note, however, in a normal music purchasing process sequence or in a retry music purchasing process sequence, the CPU 100 of the client terminal 2 executes an acquisition process according to the normal music purchasing process sequence or the retry music purchasing process sequence, whichever appropriate, using user interface 310 that corresponds to the XML browser 136, which is a program module, and middleware 311 that corresponds to the HTTP message program 130, the communicator program 131, the copyright protection management module 133, the music purchase/reproduction module 135, the authentication library 138A, the hard disk contents controller 137, the contents data access module 140 and the database access module 139.

Also note that, in the following description of the normal music purchasing process sequence and the retry music purchasing process sequence, the user interface 310 and the middleware 311 will be regarded as so many circuit blocks that are provided as hardware for the sake of convenience of description.

The control section 20 of the acquisition/use information providing server 5 may not necessarily have to prepare acquisition/use information in advance. In other words, it may generate acquisition/use information each time the user presents a music purchase request.

Additionally, the control section 30 of the contents providing server 6 may not necessarily have to open a contents providing home page to provide contents data. In other words, it can provide contents data only by preparing an address to be accessed by the client terminal 2 when the latter acquires contents data (to be referred to contents acquiring address or addresses hereinafter). Furthermore, the control section 30 may only have to establish correspondence between the contents data that the client terminal 2 can acquire and the one or more than one contents acquiring addresses without requiring the client terminal 2 to transmit the contents ID or IDs when it provides the contents.

Still additionally, the control section 40 of the attribute information providing server 7 may not necessarily have to open an attribute file providing home page to provide one or more than one contents attribute files 47. In other words, it can provide one ore more than one contents attribute files 47 only by preparing an address to be accessed by the client terminal 2 when the latter acquires the one or more than one contents attribute files 47 (to be referred to as attribute file acquiring address or addresses hereinafter).

Thus, the normal music purchasing process sequence and the retry music purchasing process sequence will be described below by way of an example where the control section 20 of the acquisition/use information providing server 5 generates acquisition/use information each time the user presents a music purchase request and the contents providing server 6 and the attribute information providing server 7 respectively provide contents data and one or more than one contents attribute files 47 without opening a contents providing home page and an attribute file providing home page.

Since the contents providing server 6 can provide contents data to the client terminal 2 without requiring the latter to transmit the corresponding contents ID, the control section 20 of the acquisition/use information providing server 5 generates one or more than one acquisition/use files 315, each of which that a contents acquiring address and an attribute file acquiring address to be used for acquiring respectively the contents data and the contents attribute file of each recorded piece of music requested for purchasing, eliminating any contents ID.

The control section 30 of the contents providing server 6 allows the user to select one or more than one recorded pieces of music on the basis of album or of single piece of music by delivering contents data of a plurality of recorded pieces of music that can be downloaded on the basis of album or single piece of music.

(2-2-1) Normal Music Purchasing Process Sequence

Figure 19:
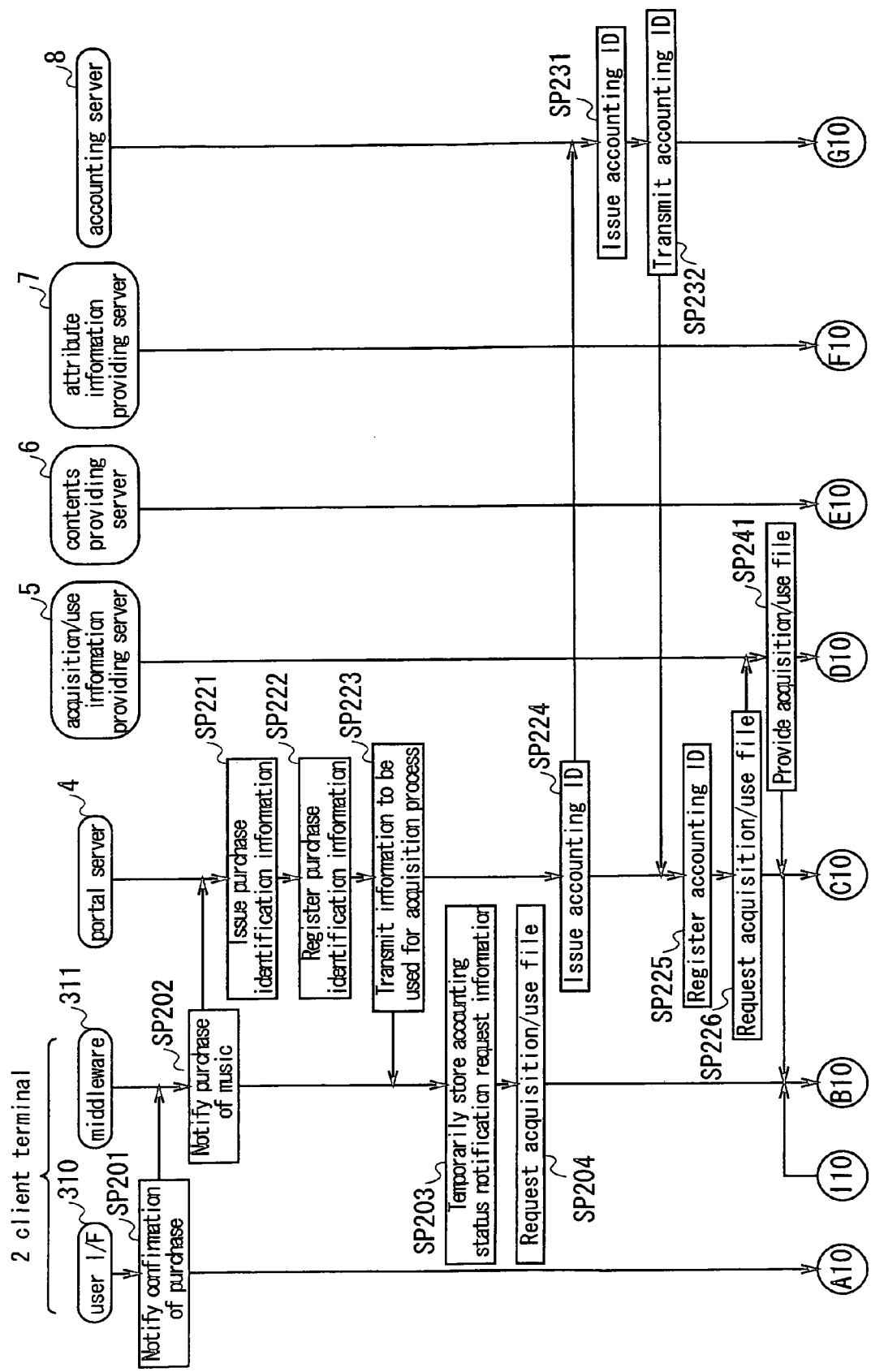
FIG. 19 is a sequence chart, illustrating a processing sequence (1) for a normal purchase of a recorded piece of music.
Figure 20:
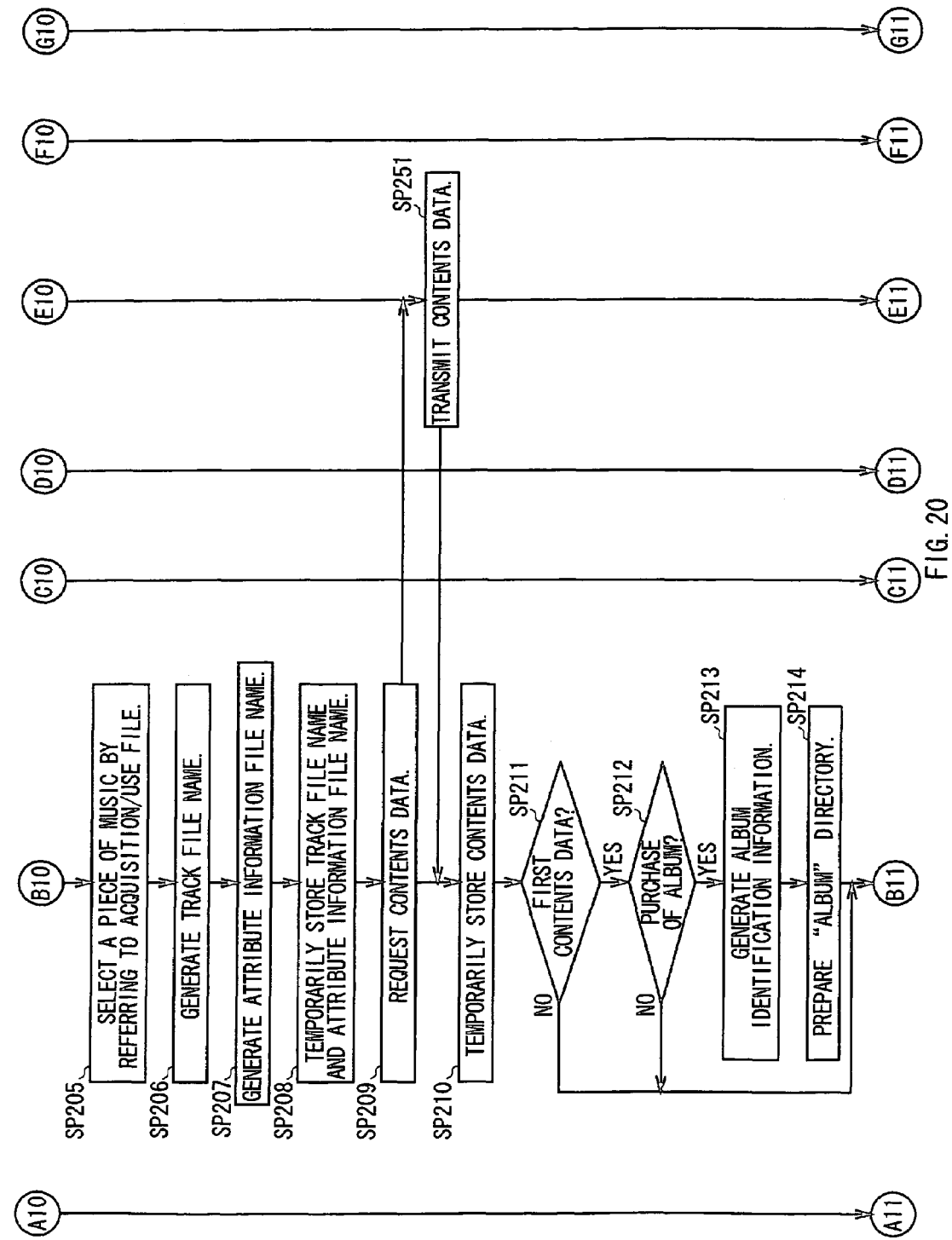
FIG. 20 is a sequence chart, illustrating another processing sequence (2) for a normal purchase of a recorded piece of music.
Figure 21:
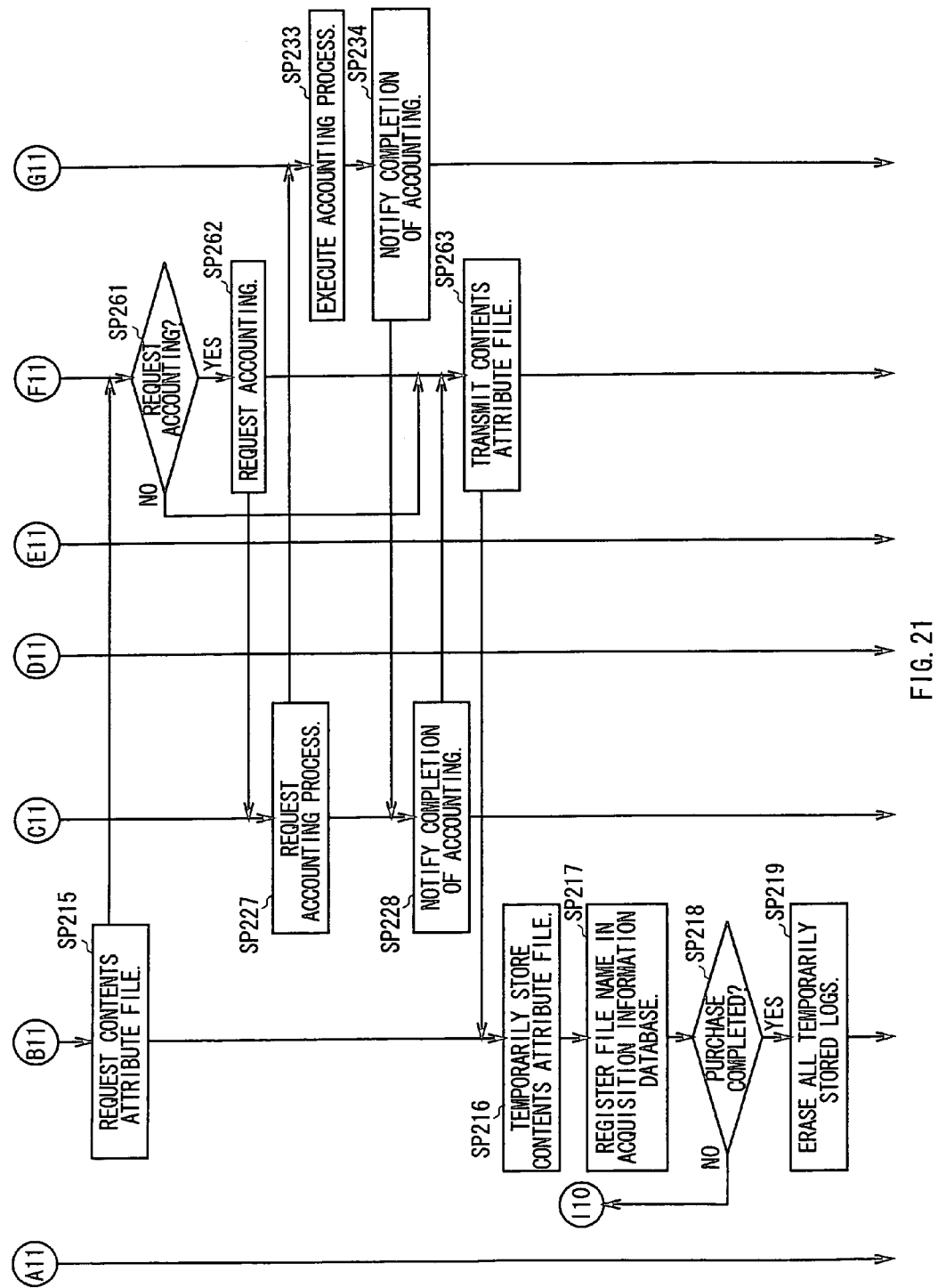
FIG. 21 is a sequence chart, illustrating still another processing sequence (3) for a normal purchase of a recorded piece of music.

Referring to FIGS. 19 through 21, as the user interface 310 of the client terminal 2 starts an acquisition process according to the normal music purchasing process sequence, the user can select one or more than one recorded pieces of music he or she wants to purchase. Then, as the one or more than one pieces of music the user wants to purchase are confirmed, the user interface 310 notifies the middleware 311 of the fact that the one or more than one pieces of music that the user wants to purchase are confirmed.

In Step S202, the middleware 311 of the client terminal 2 generates the contents ID or IDs that correspond to the one or more than one recorded pieces of music requested by the user to purchase and music purchase notification data that store the user ID or IDs and a password. Then, the middleware 311 transmits the music purchase notification data to the portal server 4 sequentially by way of the communication processing section 114 and the network interface 115.

In Step SP221, the control section 10 of the portal server 4 receives the music purchase notification data transmitted from the client terminal 2 by way of the data communication processing section 14. Then, the control section 10 issues a piece of purchase identification information typically bearing a serial number that makes the music purchasing process for the user who requested to purchase the one or more than one recorded pieces of music identifiable in response to the reception of the music purchase notification data and then moves to the next step, or Step SP222.

In Step SP222, the control section 10 identifies the personal information of the user who requested to purchase the one or more than one recorded pieces of music from the user database 13 according to the user ID and the password stored in the music purchase notification data. Then, the control section 10 establishes correspondence between the identified personal information and the contents ID or IDs of the one or more than one recorded pieces of music that the user requested to purchase stored in the music purchase notification data, registers them and moves to the next step, or Step SP223.

In Step SP223, the control section 10 generates information to be used in the acquisition process that corresponds to the request of the user to purchase the one or more than one recorded pieces of music and transmits it to the client terminal 2 by way of the data communication processing section 14.

The information to be used in the acquisition process includes the acquisition/use file request information to be used by the client terminal 2 for acquiring one or more than one acquisition/use files 315 and the accounting status notification request information to be used by the client terminal 2 at the time of requesting notification of the accounting status relative to the user when the acquisition process at the client terminal 2 is interrupted.

The acquisition/use file request information includes the address on the network 3 to be accessed by the client terminal 2 to acquire the one or more than one acquisition/use files 315 (to be referred to as file acquiring addresses hereinafter).

The accounting status notification request information includes the address to be accessed by the client terminal 2 to request notification of the accounting status to the user when the client terminal 2 resumes the interrupted acquisition process and retries the attempt of acquiring the contents data and one or more than one contents attribute files 47 (to be referred to as retry address hereinafter), the purchase identification information issued in Step SP221 so as to be presented to the holder of the retry address (that is, the portal server 4) when accessing the retry address, post data and a request code (a code that indicates the type of the request).

In Step SP203, the middleware 311 of the client terminal 2 receives the information to be used in the acquisition process transmitted from the portal server 4 sequentially by way of the network interface 115 and the communication processing section 114.

Then, as shown in FIG. 24, the middleware 311 temporarily stores the accounting status notification request information acquired on the basis of the information to be used in the acquisition process typically in the hard disk of the hard disk drive 104 as first process progress information (to be referred to as first log hereinafter) that indicates the progress of the current acquisition process (or the start of the acquisition process) and then moves to the next step, or Step SP204.

In Step SP204, the middleware 311 accesses the file acquiring address or addresses included in the acquisition/use file request information that is acquired on the basis of the information to be used in the acquisition process and requests the portal server 4 to acquire the one or more than one acquisition/use files 315.

In Step SP224, the control section 10 of the portal server 4 transmits accounting ID issuance request data, requesting issuance of an accounting ID that can identify the accounting process for the user who requested to purchase the one or more than one recorded pieces of music, in response to the request for acquiring the one or more than one acquisition/use files 315 from the client terminal 2 to the accounting server 8 by way of the data communication processing section 14.

In Step SP231, the control section 50 of the accounting server 8 receives the accounting ID issuance request data transmitted from the portal server 4 by way of the data communication processing section 54. Then, the control section 50 issues an accounting ID to respond to the accounting ID issuance request data and moves to the next step, or Step SP232.

In Step SP232, the control section 50 transmits the accounting ID to the portal server 4 by way of the data communication processing section 54 as accounting ID notification data.

Then, in Step SP225, the control section 10 of the portal server 4 receives the accounting ID notification data transmitted from the accounting server 8 by way of the data communication processing section 14. Then, the control section 10 establishes correspondence between the accounting ID acquired on the basis of the accounting. ID notification data and the purchase identification information already registered in Step SP222 and additionally registers the accounting ID.

Additionally, the control section 10 establishes correspondence between the accounting status notification information that indicates that the user has not been charged yet for the one or more than one recorded pieces of music user requested to purchase and the purchase identification information already registered in Step SP222 and registers the accounting status notification information in the user database 13 before it moves to the next step, or Step SP226.

In Step SP226, the control section 10 stores the contents ID or IDs of the one or more than one pieces of music the user requested to purchase and generates file request data for requesting one or more than one acquisition/use files 315 to be used by the client terminal 2 of the user to acquire the contents data and the one or more than one contents attribute files 47. Then, the control section 10 transmits the file request data to the acquisition/use information providing server 5 by way of the data communication processing section 14.

In Step SP241, the control section 20 of the acquisition/use information providing server 5 receives the file request data transmitted from the portal server 4 by way of the data communication processing section 24 thereof. Then, the control section 20 issues, for example, one or more than one contents acquiring addresses and one or more than one attribute file acquiring addresses in response to the file request data and generates one or more than one acquisition/use files 315 that store the one or more than one contents acquiring addresses and the one or more than one attribute file acquiring addresses arranged orderly so as to correspond to the recorded piece of music or each of the recorded pieces of music.

While the control section 20 of the acquisition/use information providing server 5 issues one or more than one contents acquiring addresses and one or more than one attribute file acquiring addresses in Step SP241 in the above description, it may alternatively be so arranged that the contents providing server 6 issues one or more than one contents acquiring addresses while the attribute information providing server 7 issues one or more than one attribute file acquiring addresses so that the control section 20 of the acquisition/use information providing server 5 may generate one or more than one acquisition/use files 315.

Then, the control section 20 transmits the one or more than one acquisition/use files 315 to the client terminal 2 from the data communication processing section 24 by way of the portal server 4. Note that the control section 20 of the acquisition/use information providing server 5 shares the generated one or more than one acquisition/use files 315, the contents ID or IDs of the one or more than one recorded pieces of music that the user requested to purchase given from the portal server 4, the purchase identification information for the user and other pieces of information with the contents providing server 6 and the attribute information providing server 7 as information to be used for providing data.

In Step SP205, the middleware 311 of the client terminal 2 receives the one or more than one acquisition/use files 315 transmitted from the acquisition/use information providing server 5 by way of the portal server 4 sequentially by way of the network interface 115 and the communication processing section 114 and temporarily stores the one or more than one received acquisition/use files 315 typically in the RAM 103.

Then, the middleware 311 picks up the contents acquiring address or selects one of the contents acquiring addresses according to the order of arrangement stored in the one or more than one acquisition/use files 315 and moves to the next step, or Step SP206.

In Step SP206, the middleware 311 generates a track file name that can identify the "track" to be used for storing the contents data that will be acquired by accessing the contents acquiring address and downloading the contents data so as to be stored in the hard disk as "track" file and then moves to the next step, or Step SP207.

In Step SP207, the middleware 311 generates an attribute information file name that can identify the contents attribute information stored in the contents attribute file 47 to be downloaded with the contents data that correspond to the contents acquiring address selected in Step SP206 when the contents attribute information is stored in the hard disk as a file (to be referred to as attribute information file hereinafter) and then moves to the next step, or Step SP208.

In Step SP208, the middleware 311 temporarily stores the track file name and the attribute information file name generated in Step SP206 and Step SP207 respectively typically in the hard disk of the hard disk drive 104 as second process progress information (to be referred to as second log hereinafter) that indicates the progress of the current acquisition process as shown in FIG. 24 and then moves to the next step, or Step SP209.

In Step SP209, the middleware 311 accesses the contents acquiring address selected in Step SP205 from the acquisition/use files 315 and requests the contents providing server 6 to download the corresponding contents data.

The control section 30 of the contents providing server 6 established correspondence between each of the contents IDs that correspond to the one or more than one recorded pieces of music that the user requested to purchase and the corresponding contents acquiring address described in the corresponding acquisition/use files 35 that has already been provided to the client terminal 2 of the user when it shared the information to be used for providing data with the acquisition/use information providing server 5.

Thus, in Step SP251, the control section 30 of the contents providing server 6 retrieves the contents data of the contents ID, which has already been made to correspond to the contents acquiring address that the client terminal 2 accesses, out of the plurality of sets of contents data stored in the contents database 33 in response to the request for downloading the contents data from the client terminal 2.

Then, the control section 30 transmits the retrieved contents data to the client terminal 2 by way of the data communication processing section 34.

In Step SP210, as the middleware 311 of the client terminal 2 receives the contents data transmitted from the contents providing server 6 sequentially by way of the network interface 115 and the communication processing section 114, it temporarily stores them in the hard disk as "track" file being the track file name generated in Step SP206 as described above and moves to the next step, or Step SP211.

The contents data provided by the contents providing server 6 stores purchase mode notification information as attribute information of the contents data typically included in the header part thereof to indicate if the data are those prepared so as to be purchased on the basis of album or of single piece of music.

Thus, in Step SP211, the middleware 311 determines if the contents data that are temporarily stored in the hard disk are those downloaded first from the contents providing server 6 in the current acquisition process or not.

If the answer to the question in Step SP211 is positive, it means that the contents data temporarily stored in the hard disk are those downloaded first from the contents providing server 6 regardless if they are requested to be purchased by the user on the basis of album or of single piece of music. Then, the middleware 311 moves to the next step, or Step SP212.

In Step SP212, the middleware 311 determines if the contents data are data to be purchased on the basis of album or not according to the purchase mode notification information stored in the contents data that are temporarily stored in the hard disk.

If the answer to the question in Step SP212 is positive, it means that the plurality of recorded pieces of music requested by the user for purchasing is to be purchased on the basis of album (in other words, the user requests to collectively purchase the plurality of pieces of music recorded in an album). Then, the middleware 311 moves to the next step, or Step SP213.

In Step SP213, the middleware 311 generates album identification information that can specify the "track" file for the contents data being acquired in response to the request for purchasing recorded pieces of music on the basis of album and the attribute information file of the contents attribute file 47 that makes the contents data available (e.g., by means of a pass) and also identify the "album" directory for managing the "track" file and the attribute information file.

Note that such album identification information is identification information generated so as to be able to specify only the contents data being currently acquired at the client terminal 2 and the corresponding contents attribute file 47. In other words, if the contents data identical with the contents data being currently acquired from the contents providing server 6 by the client terminal 2 have already been transferred from a CD to the hard disk by ripping, the album identification information can specify not the contents data transferred by ripping but only the contents data being acquired from the contents providing server 6.

Then, the middleware 311 temporarily stores the album identification information as third process progress information (to be referred to as third log hereinafter) that indicates the progress of the current acquisition process as shown in FIG. 24 and then moves to the next step, or Step SP214.

In Step S214, the middleware 311 newly prepares an "album" directory that indicates the album identification information generated in Step SP213 for the hard disk and then moves to the next step, or Step SP215.

If, on the other hand, the answer to the question in Step SP211 is negative, it means that the contents data temporarily stored in the hard disk are those downloaded subsequently relative, to the first downloading from the contents providing server 6 regardless if they are requested to be purchased by the user on the basis of album or of single piece of music. Then, the middleware 311 moves to Step SP215.

Additionally, if the answer to the question in Step S212 is negative, it means that one or more than one recorded pieces of music requested by the user for purchasing is to be purchased on the basis of single piece of music.

Meanwhile, as described above by referring to Step SP213 and Step SP214, the middleware 311 newly prepares an "album" directory for the hard disk each time a plurality of recorded pieces of music is requested to be purchased on the basis of album.

However, directories for managing contents data on the basis of single piece of music and the contents attribute files 47 that make the respective sets contents data available are prepared in advance in the hard disk.

Note that the middleware 311 uses one of a plurality of "album" directories arranged hierarchically as described above by referring to FIG. 12 to collectively manage a plurality of sets of contents data and a plurality of contents attribute files 47 on the basis of single piece of music.

Therefore, if the question to the answer in Step SP212 is negative because the user requested to purchase one or more than one recorded pieces of music on the basis of single piece of music, the middleware 311 does not newly prepare a directory for managing the contents data and the contents attribute file or files 47 corresponding to the one or more than one recorded pieces of music and simply moves to Step SP215.

In Step SP215, the middleware 311 selects the attribute file acquiring address that corresponds to the contents acquiring address selected in Step SP205 as described above out of the acquisition/use file 315.

Then, the middleware 311 accesses the selected attribute file acquiring address and requests the attribute information providing server 7 to download the contents attribute file 47.

The attribute information providing server 7 holds a list of attribute file acquiring addresses for acquiring the contents IDs of the set of contents data to be provided to the client terminal 2 and the contents attribute files 47 that make the contents data available as it shares information to be used for providing data with the acquisition/use information providing server 5 and the contents providing server 6.

The list additionally contains the purchase identification information that can specify the music purchasing process for the user who is currently acquiring the contents attribute files 47 along with the contents data. In the list, the contents IDs and the attribute file acquiring addresses are described and arranged in the order of downloading the contents data so as to make them correspond to the respective recorded pieces of music with respect to the client terminal 2.

Additionally, a flag to be used to indicate the request for charging the user only when the client terminal 2 accesses the leading attribute file acquiring address (which is the attribute file acquiring address to be accessed first for the purpose of acquiring the corresponding contents attribute file 47 when the client terminal 2 executes an acquisition process) out of one or more than one attribute file acquiring addresses is attached to the list.

In other words, in the above-described normal music purchasing process sequence, regardless if a user requests to purchase a plurality of recorded pieces of music in a purchase mode of purchasing them on the basis of album or in a purchase mode of purchasing them on the basis of single piece of music, an accounting process for all the recorded pieces of music that the user requests to purchase is collectively executed for the user when the client terminal 2 requests the first contents attribute file 47 to be downloaded.

Thus, in Step SP261, the control section 40 of the attribute information providing server 7 firstly determines if it should charge the user of the client terminal 2 or not according to the list in response to the request from the client terminal 2 for downloading a contents attribute file 47.

If the answer to the question in Step SP261 is positive, it means that the attribute file acquiring address that the client terminal 2 currently accesses is the attribute file acquiring address accessed first in order for the client terminal 2 to acquire the first contents attribute file 47 in the current normal music purchasing process sequence. Then, the control section 40 moves to the next step, or Step SP262.

In Step SP262, the control section 40 transmits the accounting request data that stores the purchase identification information added to the list and charges the user at the client terminal 2 that is currently requesting the contents attribute file 47 to be downloaded for the plurality of recorded pieces of music that the user purchases to the portal server 4 by way of the data communication processing section 44.

In Step SP277, the control section 10 of the portal server 4 receives the accounting request data transmitted from the attribute information providing server 7 by way of the data communication processing section 14. Then, the control section 10 specifies the personal information of the user who requests to purchase the plurality of recorded pieces of music out of the user database 13 according to the purchase identification information stored in the accounting request data.

Then, the control section 10 generates accounting process execution request data that store the accounting ID for the user who currently requests to purchase the plurality of recorded pieces of music, the accounting ID being contained in the specified personal information, and the contents IDs corresponding to all the recorded pieces of music requested for purchasing and request the accounting server 8 to execute an accounting process for the user. Then, the control section 10 transmits the accounting process execution request data to the accounting server 8 by way of the data communication processing section 14.

In Step SP233, the control section 50 of the accounting server 8 receives the accounting process execution request data transmitted from the portal server 4 by way of the data communication processing section 54. Then, the control section 50 specifies various pieces of information including accounting information and the like to be used for the accounting process for the user who currently requests to purchase the plurality of recorded pieces of music according to the accounting ID and the contents IDs stored in the accounting process execution request data and executes the accounting process for the user, using the specified various pieces of information including the accounting information.

Then, as the control section 50 completes the accounting process as a result, it transmits accounting completion notification data that store the accounting ID back to the portal server 4 by way of the data communication processing section 54 to notify the completion of the accounting process in the next step, or Step SP234.

In Step SP228, the control section 10 of the portal server 4 receives the accounting completion notification data transmitted from the accounting server 8 by way of the data communication processing section 14.

Then, the control section 10 specifies the purchase identification information for the user in the user database 13 according to the accounting ID stored in the accounting completion notification data and updates the accounting status notification information that indicates the uncharged account that is registered so as to correspond to the purchase identification information by the accounting status notification information that indicates the completion of the accounting process as notified by the accounting completion notification data. Then, the control section 10 transmits the accounting completion data that indicate the completion of the accounting process for the user to the attribute information providing server 7 by way of the data communication processing section 14.

In Step SP263, the control section 40 of the attribute information providing server 7 receives the accounting completion data transmitted from the portal server 4 by way of the data communication processing section 44 and accordingly recognizes that the accounting process has been completed for the user.

Then, the control section 40 generates contents attribute files 47 according to the contents IDs and the like that have already been made to correspond to the respective attribute file acquiring addresses accessed by the client terminal 2 in Step SP215. Then, the control section 40 transmits the contents attribute files 47 to the client terminal 2 by way of the data communication processing terminal 44.

Note that, if the answer to the question in Step SP261, which is already described above, is negative, it means that the attribute file acquiring address that is currently accessed by the client terminal 2 is the one that is accessed by the client terminal 2 to acquire the second or subsequent contents attribute file 47 in the current normal music purchasing process sequence.

In other words, the negative answer indicates that the accounting process is completed for the user. Then, therefore, the control section 40 moves to Step SP263.

In Step SP216, as the middleware 311 of the client terminal 2 receives the contents attribute file 47 transmitted from the attribute information providing server 7 sequentially by way of the network interface 115 and the communication processing section 114, it temporarily stores the contents attribute information contained in the contents attribute file 47 in the hard disk as attribute information file whose attribute information file name is generated in Step SP207, which is already described above, and moves to the next step, or Step SP217.

In Step SP217, the middleware 311 registers the album identification information generated in Step SP213, which is already described above, in the acquisition information database that is built in advance in the hard disk, if the user requests to purchase the plurality of recorded pieces of music on the basis of album.

Additionally, the middleware 311 establishes correspondence between the track file name for the contents data downloaded in Step SP210, which is already described above, and the attribute information file name of the contents attribute file 47 downloaded in Step SP216, which is also already described above, as information of a hierarchically lower order relative to the album identification information and registers them in the acquisition information database.

Note that, when the middleware 311 once registers album identification information in the acquisition information database, it subsequently additionally registers only the track file name and the attribute information file name of the contents data and the contents attribute file 47 that are downloaded at a time, establishing correspondence between them and the album identification information thereof, to the acquisition information database.

If, on the other hand, in Step SP217, the user requests to purchase a plurality of recorded pieces of music on the basis of single piece of music, the middleware 311 establishes correspondence between the track file name for the contents data downloaded in Step SP210, which is already described above, and the attribute information file name of the contents attribute file 47 downloaded in Step SP216, which is also already described above, as information of a hierarchically lower order relative to the identification information for the identification information that is specific to the directory for managing single pieces of music and already registered in the acquisition information database (to be referred to as single identification information hereinafter).

Then, the middleware 311 puts the "track" file and the attribute information file of the contents data and the contents attribute file 47 downloaded from the contents providing server 6 and the attribute information providing server 7 respectively into a state where they can be managed by an "album" directory having a directory structure similar to the one described above by referring to FIG. 12 or by a directory for managing single pieces of music and then switches the contents data and the contents attribute file 47 from a temporarily stored state to a permanently stored state.

As a result, after specifying the contents data and the corresponding contents attribute file 47 downloaded respectively from the contents providing server 6 and the attribute information providing server 7 by means of the album identification information or the single identification information, the middleware 311 modifies the contents data so as to turn them into an available state according to the corresponding contents attribute file 47 and then moves to the next step, or Step SP218.

In Step SP218, the middleware 311 determines if all the contents data and the corresponding contents attribute files 47 that are currently requested for purchasing have been downloaded or not (in other words, if all the recorded pieces of music requested for purchasing have been actually purchased or not).

If the answer to the question in Step SP218 is negative, it means that a plurality of recorded pieces of music are currently requested for purchasing by the user and all the contents data of the recorded pieces of music and the corresponding contents attribute files 47 have not been downloaded yet. Thus, the middleware 311 then returns to Step SP205.

The middleware 311 recurrently repeats the processing operations from Step SP205 to Step SP218 until the answer to the question in Step SP218 becomes positive. Thus, in this way, the middleware 311 sequentially downloads the contents data of the recorded pieces of music requested by the user to purchase and the corresponding contents attribute files 47 respectively from the contents providing server 6 and the attribute information providing server 7 according to the description of the acquisition/use files 315.

If, on the other hand, the answer to the question in Step SP218 is positive, it means that all the contents data of the recorded pieces of music currently requested by the user to purchase and the corresponding contents attribute files 47 have been downloaded and registered in the acquisition information database. Then, the middleware 311 moves to the next step, or Step SP219.

In Step SP218, the middleware 311 erases all of the first through third logs it temporarily stored in the hard disk during the execution of the acquisition process and ends the acquisition process corresponding. to the music purchase request (2-2-2) Retry Music Purchasing Process Sequence The power supply to the client terminal 2 may be suspended during the above described acquisition process because, for example, the user inadvertently pulls out the plug of the power supply cord or that of the network cable of the client terminal 2. Then, the communication line between the client terminal 2 and the network 3 is temporarily disconnected and the acquisition process may be interrupted.

Figure 22:
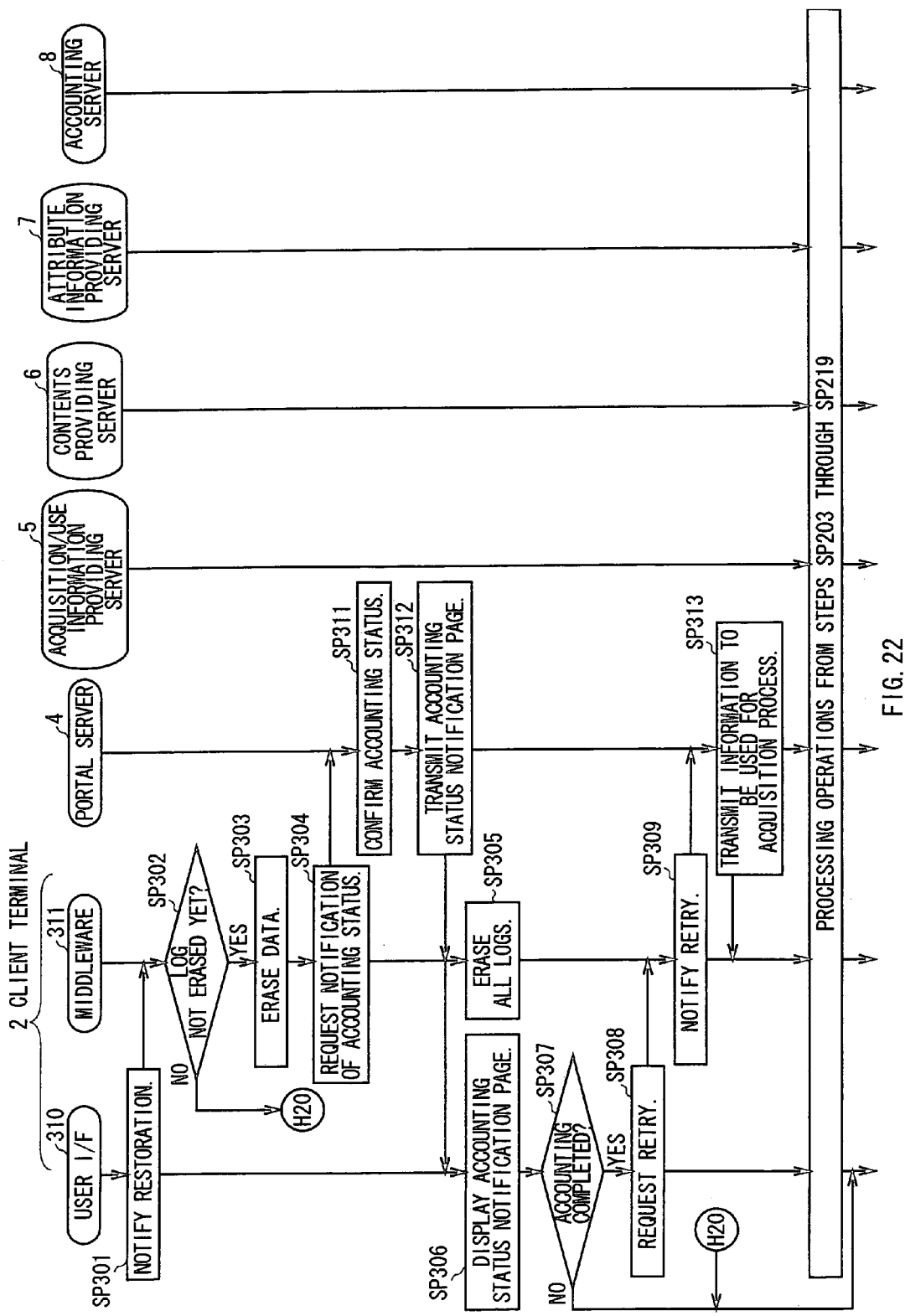
FIG. 22 is a sequence chart, illustrating a processing sequence for a retry of a purchase of a recorded piece of music.

The retry music purchasing process sequence to be followed by the client terminal 2 to restart the acquisition process and reconnect the communication line to the network 3 in order to resume the interrupted acquisition process will be described below by referring to a sequence chart shown in FIG. 22, in which the components same as or similar to those of FIGS. 19 through 21 are denoted respectively by the same reference symbols.

When the acquisition process is restarted after a suspension of power supply or the communication line to the network 3 is restored after an inadvertent disconnection, the client terminal 2 starts a reaquisition process in the retry music purchasing process sequence.

As the client terminal 2 starts a reaquisition process, the user interface 310 notifies the middleware 311 of the fact that the client terminal 2 recovers the state where it can utilize the network 3 in Step SP301 and then moves to the next step, or Step SP302.

In Step SP302, the middleware 311 of the client terminal 2 determines if the first, second and/or third logs that are temporarily stored in the hard disk in the preceding acquisition process before it recovers the state where it can utilize the network 3 are still left there without being erased or not.

If the answer to the question in Step SP302 is negative, it means that the power supply to the client terminal 2 was suspended or the communication line to the network 3 was disconnected while the client terminal 2 was not executing the acquisition process corresponding to the current music purchase request and hence none of the first through third logs is left in the hard disk.

Then, the middleware 311 ends the reaquisition process in the retry music purchasing process sequence by notifying the interface 310 of the fact that it had not been executing any acquisition process before it recovered the state where it can utilize the network 3.

If, on the other hand, the answer to the question in Step SP302 is positive, it means that the communication line to the network 3 is disconnected probably because the plug of the power supply cord or that of the network cable of the client terminal 2 is pulled out while the client terminal 2 is executing an acquisition process that corresponds to a music purchase request and consequently the acquisition process is interrupted. In other words, the positive answer means that at least the first log is temporarily stored and left in the hard disk out of the first through third logs. Thus, the middleware 311 then moves to the next step, or Step SP303.

In Step SP303, the middleware 311 specifies all the contents data and the contents attribute files 47 that had already been stored in the hard disk at the time of the interruption of the acquisition process on the basis of the track file name and the attribute information file name of the second log, which is left unerased, and the album identification information of the third log, which is also left unerased. Then, the middleware 311 erases all the contents data and the contents attribute files 47 that are specified and moves to the next step, or Step SP304.

In Step SP304, the middleware 311 accesses the retry address contained in the accounting status notification request information that is temporarily stored in the hard disk as first log in response to the notification from the user interface 310. In this state, the middleware 311 transmits the purchase identification information contained in the accounting status notification request information to the portal server 4 along with post data and a request code sequentially by way of the communication processing section 114 and the network interface 115.

In Step SP311, the control section 10 of the portal server 4 receives the purchase identification information and the other pieces of information transmitted from the client terminal 2 by way of the data communication processing section 14. Then, the control section 10 retrieves the accounting status notification information of the user from the user database 13 on the basis of the purchase identification information and confirms the accounting status of the user according to the retrieved accounting status notification information before it moves to the next step, or Step SP312.

In Step SP312, the control section 10 transmits page information for notifying the accounting status, which is prepared according to the confirmed accounting status of the user, to the client terminal 2 by way of the data communication processing section 14.

In Step SP305, the middleware 311 of the client terminal 2 receives the page information transmitted from the portal server 4 sequentially by way of the network interface 115 and the communication processing section 114.

Then, the middleware 311 erases all of the first through third logs that are left unerased in the hard disk (that is all of the first through third logs that are temporarily stored in the immediately preceding acquisition process) in accordance with the reception of the page information. Additionally, the middleware 311 gives the page information it receives from the portal server 4 to the user interface 310.

Then, in Step SP306, the user interface 310 transmits the page information it receives from the portal server 4 to the display 107 by way of the display processing section 111 so as to have the display 107 display an image formed on the basis of the page information and moves to the next step, or Step SP307.

In Step SP307, the user interface 310 determines if the accounting process for the user has been completed or not according to the accounting status notification information buried typically by the portal server 4 in the page being displayed on the display 107.

In this step, or Step SP307, the user interface 310 has the display 107 display a page (not shown) that varies depending on if the user has already been charged or not and, when it detects that the user has not been charged yet according to the page, it ends the reacquisition process in the retry music purchasing process sequence.

When, on the other hand, in Step SP307, the user interface 310 has the display 107 display a page (not shown) that corresponds to a situation where the user has already been charged and detects that the accounting process has been completed from the page, it moves to the next step, or Step SP308.

In Step SP308, the user interface 310 requests the middleware 311 to retry the process of acquiring data for the contents data and the contents attribute files 47 that were supposed to be acquired in the interrupted immediately preceding acquisition process.

Then, in Step SP309, the middleware 311 generates retry notification data for notifying a retry the operation of acquiring the data that were supposed to be acquired in the interrupted acquisition process. Then, the middleware 311 accesses the retry address contained in the information to be used for the acquisition process that was already acquired in the interrupted immediately preceding acquisition process and transmits the retry notification data to the portal server 4 sequentially by way of the communication processing section 114 and the network interface 115.

In Step SP313, the control section 10 of the portal server 4 receives the retry notification data transmitted from the client terminal 2 by way of the data communication processing section 14. Then, the control section 10 generates information to be used for the acquisition process that is similar to the one generated in Step SP223 and contains the purchase identification information that was issued in the interrupted immediately preceding acquisition process and transmits it to the client terminal 2 by way of the data communication processing section 14.

Note that, if the file acquiring address for acquiring the acquisition/use files 315 and the address for accounting various pieces of page information have been changed, the control section 10 generates updated information to be used for the acquisition process and provides it to the client terminal 2.

Thereafter, the client terminal 2, the portal server 4 and the other servers 5 through 8 carry out the processing operations of Steps SP203 through SP219 of the above described normal music purchasing process sequence. Thus, the client terminal 2 cooperates with the portal server 4 and the other servers 5 through 8 to reaquire the acquisition/use files 315 by way of the portal server 4. In this way, it acquires all the contents data and the contents attribute files 47 it was supposed to acquire in the interrupted immediately preceding acquisition process. However, since the accounting server 8 has completed the accounting process for the user in the interrupted immediately preceding acquisition process, it does not participate in the retry process for acquiring those data.

Then, the user interface 310 of the client terminal 2 ends the reacquisition process that corresponds to the process of retrying the data.

(3) Operations and Advantages

In the above described arrangement, when the client terminal 2 of the data distribution system 1 receives a request for purchasing recorded pieces of music from the user, it acquires the acquisition/use files 25 from the acquisition/use information providing server 5 to be used for the acquisition process to be executed in response to the request for purchasing the recorded pieces of music and temporarily stores them in the hard disk. In this state, the client terminal 2 acquires the contents data and the contents attribute file 47 that correspond to one of the request contents IDs selected from the acquisition/use files 25 respectively from the contents providing server 6 and the attribute information providing server 7. In this way, it alternately acquires contents data and contents attribute files 47.

Then, when the communication line connecting the client terminal 2 to the network 3 is disconnected during the acquisition process and the client terminal 2 recovers the state where it can utilize the communication line, the client terminal 2 resumes the acquisition process that has been interrupted because of the disconnection of the communication line. Then, the client terminal 2 firstly requests accounting status notification information that indicates if the accounting process for the contents data and the contents attribute files 47 had been complete or not by the time when the acquisition process was interrupted from the portal server 4.

Then, as a result, the portal server 4 acquires accounting status notification information that corresponds to the interrupted acquisition process from the attribute information providing server 7 who manages accounting status notification information and generates accounting status notification images 15 and 16. Then, it transmits the accounting status notification images to the client terminal 2.

Then, when the communication line connecting the client terminal 2 to the network 3 (and hence to the contents providing server 6 and the attribute information providing server 7) in the acquisition process is disconnected and subsequently restores the original state and the acquisition process is resumed, the client terminal 2 can acquire accounting status notification information that indicates if the accounting process that corresponds to the contents data and the contents attribute files 47 had been completed by the time when the acquisition process was interrupted.

In the case of this embodiment, the client terminal 2 shows the accounting status notified from the portal server 4 in the form of an accounting status notification image to the user so that the user can decide if he or she continues the acquisition process or cancels it, referring to the progress of the accounting process.

In the data delivery system 1, if the accounting process had been completed by the time when the acquisition process of the client terminal 2 was interrupted and there are left some unacquired contents data and unacquired contents attribute files 47 (in other words, the reception of the contents data and the contents attribute files 47 has not been completed), the user who requested to purchase the recorded pieces of music can suffer from a loss if the acquisition process is left suspended because the accounting process for all the contents data and the contents attribute files 47 including the unacquired ones has been completed.

Therefore, the user who requested to purchase the recorded pieces of music will certainly ask the client terminal 2 to continue the purchase (or the acquisition process) to thereby acquire the remaining contents data and the remaining contents attribute files 74 through the client terminal 2.

Additionally, in the data delivery system 1, the attribute information providing server 7 requests the accounting server 8 to start the accounting process when it transmits a contents attribute file 47 to the client terminal 2 for the first time. Thus, there may arise a situation where the client terminal 2 has completed the reception of the contents attribute file 47 (and hence acquired it), although the accounting had not been completed by the time when the acquisition process was interrupted, in the client terminal 2.

Then, the user who requested to purchase the recorded pieces of music may unduly acquire contents data and contents attribute files 47 at the cost of the copyright owner if he or she leaves the acquisition process suspended although the user has acquired one or more than one contents attribute files 47 at the client terminal 2 notwithstanding the accounting process has not been completed. Then, the user may not been titled to receive any contents delivery service any longer.

Therefore, the user will certainly ask the client terminal 2 to continue the purchase to acquire the remaining contents data and the remaining contents attribute files 74 and complete the accounting process.

Thus, with the above described arrangement, when the communication line from the client terminal 2 to the network 3 is restored after a disconnection that took place during an acquisition process and the acquisition process that has been interrupted due to the disconnection of the communication line is restarted, the client terminal 2 requests the portal server 4 to transmit accounting status notification information that indicates if the accounting process for the contents and the contents attribute files 47 to be acquired had been completed by the time of the interruption of the acquisition process or not and receives the corresponding accounting status notification image data transmitted from the portal server 4 in response so that, when the interrupted acquisition process is resumed, the user is notified if the accounting process had been completed by the time of the interruption of the acquisition process or not. Thus, the data delivery system 1 can reliably handle a situation where the user continues the acquisition process of acquiring the contents data and the contents attribute files 47 and a situation where the user discontinues the process, when the acquisition process interrupted due to the disconnection of the communication line was resumed.

On the other hand, when the client terminal 2 executes an acquisition process according to a music purchase request from the user, it appropriately keeps the process progress information indicating the extent of progress of the acquisition process so that, if the acquisition process is interrupted and subsequently restarted, it resume the operation of acquiring contents data but, if it has acquired all the contents data to be acquired, it does not request the contents providing server 6 to transmit the contents data in duplicate and simply resume the operation of acquiring the contents attribute files 47. Thus, it is possible to reliably prevent the acquisition process from being executed redundantly twice. In other words, if the accounting process had been completed by the time of the interruption of the acquisition process and the interrupted acquisition process is resumed, the client terminal 2 can almost reliably prevent from unduly acquiring contents data and contents attribute files 47 in duplicate beyond the extent to which the accounting process has been completed.

Additionally, when the acquisition process is resumed after an interruption, the client terminal 2 checks if the first and second logs are left unerased or not and, if the first and second logs are left unerased, it erases all the contents data and the contents attribute data 47 that had been stored in the hard disk by the time when the acquisition process was interrupted by referring to the second log and subsequently retires the acquisition of the contents data and the contents attribute files 47 that were supposed to be acquired in the interrupted acquisition process. Thus, when retrying the data acquisition, it is possible to reliably prevent the contents data and the contents attribute files 47 that are already stored in the hard disk from being stored in duplicate to consequently reduce the free space in the hard disk and make it difficult to store the required contents data and the required contents attribute files 47 so that the necessary contents data and the necessary contents attribute files 47 may reliably acquired and stored by the data distribution system 1.

Still additionally, when a plurality of recorded pieces of music are requested to be purchased on the basis of album, the client terminal 2 generates album identification information that can specify the contents data and the contents attribute files 47 to be downloaded and temporarily stores them as third log during the acquisition process. Then, each time it downloads some of the contents data and the corresponding acquisition authorization data 301, it establishes correspondence between the album identification information and a tack file name and an attribute information file name as lower hierarchical layer relative to the album identification information and registers them in the acquisition information database. As the client terminal 2 downloads all the contents data and the contents attribute files 47 to be acquired and registers the track file names and the attribute information file names for which correspondence is established with the album identification information, it erase all the logs. Thus, when retrying the data acquisition process and if the album identification information is left unerased as third log, the client terminal 2 can easily and collectively erase the album identification information as well as the contents data and the contents attribute files 47 that can be specified by the album identification information simply by erasing the album identification information from the acquisition information database. Then, it is possible to quickly restore the free space of the hard disk that existed at the time when the process of acquiring the contents data and the contents attribute files 47 started and hence efficiently reacquire the contents data and the contents attribute files 47.

Still additionally, after erasing the album identification information from the acquisition information database, it is possible for the client terminal 2 to quickly restore the free space of the hard disk that existed at the time when the process of acquiring the contents data and the contents attribute files 47 started and hence reliably avoid a situation where the hard disk is in short of free space when the client terminal 2 is reacquiring the contents data and the contents attribute files 47 by specifying the contents data and the contents attribute files 47 that are only part of the contents data and the contents attribute files 47 to be acquired and erasing them by referring to the track file names and the attribute information file names that are left unerased in the hard disk as second log.

Furthermore, the client terminal 2 can reacquire the acquisition/use files 315 from the portal server 4 and utilize them to reacquire the contents data and the contents attribute files 47 at the time of retrying the data acquisition. Thus, if an effective period is defined for the acquisition/use files 315, the user can retry the data acquisition at an arbitrarily selected time without minding such an effective period to improve to a great convenience to the user for the use of the client terminal 2.

(4) Other Embodiments

While the client terminal 2 acquires contents data and contents attribute files 47 in response to a music purchase request from the user in the above-described embodiment, the present invention is by no means limited thereto. For example, it may alternatively be so arranged that the client terminal 2 is loaded with a storage medium such as CD (compact disk) that stores contents data that are not authorized to be reproduced and the contents IDs of the contents data are registered in the acquisition information database. Then, it may further be so arranged that, when it is requested to reproduce contents data from the storage medium, only the contents attribute files 47 that correspond to the contents data to be reproduced are acquired by following the acquisition process sequence described above by referring to FIGS. 14 through 18. Then, it is possible to allow the user to listen to the recorded pieces of music that correspond to the contents data without storing contents data that are not authorized to be reproduced in the hard disk.

Additionally, it may alternatively be so arranged that the client terminal 2 is loaded with a storage medium such as CD that stores contents data whose authorized reproduction period is limited for audition and the contents IDs of the contents data are registered in the acquisition information database. Then, if some of the recorded pieces of music reproduced from the contents data are appealing to the user as a result of an audition held within the authorized reproduction period, the user can acquire only the contents data of the appealing pieces of music and the corresponding contents attribute files 47, following the acquisition process sequence described above by referring to FIGS. 14 through 18, and have the authorized reproduction period extended or the authorized number of times of reproduction increased. In this case again, it is possible to allow the user to listen to the recorded pieces of music that correspond to the contents data without storing contents data that are not authorized to be reproduced in the hard disk.

While the client terminal 2 displays the accounting status notification image it acquires from the portal server 4 for the user and asks the user to resume the interrupted acquisition process or not in the above-described embodiment, the present invention is by no means limited thereto. For example, it may alternatively be so arranged that, when the client terminal 2 is notified of accounting status notification information by the portal server 4, the CPU 100 determines if the accounting process has been completed or not by referring to the accounting status notification information and, if the accounting process has not been completed, it determines if the reception of the contents attribute files 47 has been completed or not by referring to the process progress information (or the file names) that had been temporarily stored in the hard disk by the time when the acquisition process was interrupted. Then, it may additionally be so arranged that the resumed acquisition process is automatically continued if, as a result, it is determined that the reception of the contents attribute files 47 has been completed.

With this arrangement, it is possible for the client terminal 2 to reliably prevent a situation where the acquisition process is suspended in a state where the accounting process is not completed but the contents attribute files 47 have been acquired to make the copyright owner suffer from an economic loss.

Additionally, it may be so arranged that, if the client terminal 2 detects one or more than one contents attribute files 47 that had been completely received by the time when the acquisition process was interrupted, it notifies the user of the detection by way of the display 107 or the like. With such an arrangement, it is possible for the user to correctly decide if he or she continues the interrupted acquisition process or not on the basis of the notification of the accounting status and detection or non-detection of contents attribute files 47.

When the connection of the communication line is recovered after a disconnection, the client terminal 2 accesses the home page of the portal server 4, the address of which the client terminal 2 has in advance, and requests accounting status notification information in the above-described embodiment to be transmitted. However, the present invention is by no means limited thereto. It may alternatively be so arranged that the portal server 4 notifies the client terminal 2 of the address of the accounting status notification information providing home page when the acquisition process is started or resumed after a temporary interruption.

While the portal server 4 acquires only accounting status notification information from the attribute information providing server 7 and transmits accounting status notification images 15 and 16 as respectively shown in FIGS. 3 and 4 that the portal server 4 generates according to the accounting status notification information to the client terminal 2 in the above-described embodiment, the present invention is by no means limited thereto. It may alternatively be so arranged that the attribute information providing server 7 keeps history information that indicates if it has transmitted contents attribute files 47 to the client terminal 2 or not and the portal server 4 transmits accounting status notification images that are provided only with a purchase continuation button to the client terminal 2 if the accounting process has not been completed but contents attribute files 47 have been transmitted to the client terminal 2.

With the above-described arrangement, the client terminal 2 can reliably prevent a situation where the accounting process has not been completed but the acquisition process is discontinued and the client terminal 2 unduly acquires contents attribute files 47 to make the copyright owner suffer from an economic loss.

Still additionally, while the attribute information file name is generated after the generation of the track file name in an acquisition process in the above described embodiment, the present invention is by no means limited thereto and it may alternatively be so arranged that the track file name is generated at any of various timings after the generation of the attribute information file name.

Still additionally, while the user can request to purchase recorded pieces of music on either on the basis of album or on the basis of single piece of music at his or her own will in the above described embodiment, the present invention is by no means limited thereto and it may alternatively be so arranged that the user can request to purchase a combination of one or more than one albums and one or more than one single pieces of music. When the user requests to purchase a one or more than one albums and one or more than one single pieces of music in combination, it may be so arranged that, each time a set of contents data is downloaded, it is checked in the acquisition process if the set of contents data are for an album or for one or more than one pieces of music and the outcome of the check is reflected to the registration of the track file name and the attribute information file name in the acquisition information database.

When the client terminal 2 downloads contents data and contents attribute files 47 for single recorded pieces of music, it establishes correspondence between the single identification information that is prepared in advance and the track file name and the attribute information file name for registration in the above-described embodiment. However, the present invention is by no means limited thereto. It may alternatively be so arranged that, when the client terminal 2 downloads contents data and contents absolute files 47 for single recorded pieces of music it generates erasable single identification information as log.

With this arrangement, when the client terminal 2 retries the data acquisition, it erases the single identification information from the acquisition information database as in the case of using album identification information, which is described above. Then, the contents data and the contents attribute files 47 that correspond to the single pieces of music can be collectively erased without problem.

Identification information that can specify the contents data to be downloaded from the contents providing server 6 and the contents attribute files 47 to be downloaded from the attribute information providing server 7 is not limited to album identification information and single identification information for the purpose of the present invention. Identification information that can be used in a similar manner may be generated for each purchase request when a piece of music is requested to be purchased and/or for a unit of a number of recorded pieces of music.

While an attribute information acquisition apparatus according to the invention is applied to a client terminal 2 as described above by referring to FIGS. 1 through 24 in the above description of the embodiment, the present invention is by no means limited thereto. Alternatively, it can be applied to any of a wide variety of attribute information acquisition apparatus such as information processing apparatus including personal computers, cellular phones, PDAs (personal digital assistances), and disk players including CD players and DVD (digital versatile disk) players.

While hardware circuit blocks and program modules are installed in the client terminal 2 in the above described embodiment, they may alternatively be installed in a terminal apparatus other than a client terminal 2 such as a cellular phone or a personal computer. In other words, a terminal apparatus in which such hardware circuit blocks and program modules are installed can execute processes like the above-described client terminal 2.

While an accounting status notification apparatus according to the invention is applied to the portal server 4 that comprises a computer as described above by referring to FIGS. 1 through 24 in the above description of the embodiment, the present invention is by no means limited thereto. Alternatively, it may be applied to any of a variety of information processing apparatus including personal computers, cellular phones and PDAs. Additionally, it may also be applied to apparatus having an accounting status notification feature such as the attribute information providing server 7 and the accounting server 8.

While an attribute information acquisition program according to the invention is applied to a group of program modules including the HTTP message program 130, the communicator program 131, the copyright protection management module 133, the music purchase/reproduction module 135, the XML browser 136, the authentication library 138A, the hard disk contents controller 137, the database access module 139, and the contents data access module 140 and the CPU 100 of the client terminal 2 executes acquisition processes, resumed acquisition processes and reacquisition processes according to the attribute information acquisition program as described above by referring to FIGS. 14 through 22 in a music purchasing process sequence, the present invention is by no means limited thereto. Any of various attribute information acquisition programs having different structures may be applied to them and acquisition processes may be executed by installing a program storage medium that stores such an attribute information acquisition program in the client terminal 2.

While an accounting status notification program according to the present invention is applied as the accounting status notification program that is stored in advance in the ROM 11 of the portal server 4 and the control section 10 of the portal server 4 executes the accounting status notification processes (Steps SP91 and SP92 and Steps SP311 and SP312) of the music purchasing process sequences described above by referring to FIGS. 14 through 22 according to the accounting status notification program in the above described embodiment, the present invention is by no means limited thereto. Any of various other accounting status notification programs having different structures may be applied and accounting status notification processes may be executed by installing a program storage medium that stores such an accounting status notification program in the portal server 4.

While the CPU 100, the communication processing section 114 and the network interface 115 of the client terminal 2 described above by referring to FIGS. 1 through 24 are made to operate as an attribute request information transmitting means for transmitting attribute request information requesting contents attribute information necessary for altering the attributes of the contents data stored in a storage medium to the attribute information providing apparatus in the above described embodiment, the present invention is by no means limited thereto. Any of a variety of attribute request information transmitting means such as an attribute request information transmission circuit, which is a hardware circuit adapted to transmit attribute request information to the attribute information providing apparatus, or a radio communication interface may alternatively be applied for the purpose of the present invention.

While the CPU 100, the communication processing section 114 and the network interface 115 of the client terminal 2 described above by referring to FIGS. 1 through 24 are made to operate as an attribute information receiving means for receiving contents attribute information transmitted from the attribute information providing apparatus in response to the transmission of attribute request information to the attribute information providing apparatus in the above-described embodiment, the present invention is by no means limited thereto. Any of various attribute information receiving means such as an attribute information reception circuit, which is a hardware circuit adapted to receive contents attribute information, or a radio communication interface may alternatively be applied for the purpose of the present invention.

When the communication line to the attribute information providing apparatus is disconnected while receiving contents attribute information and subsequently the communication line to the attribute information providing apparatus recovers a communicable state in the above-described embodiment, the CPU 100, the communication processing section 114 and the network interface 115 of the client terminal 2 described above by referring to FIGS. 1 through 24 are made to operate as a notification request information transmitting means for transmitting notification request information that requests accounting status notification information indicating if the accounting process corresponding to the contents attribute information has been completed or not. However, the present invention is by no means limited thereto. Any of various notification request information transmitting means such as a notification request information transmission circuit, which is a hardware circuit adapted to transmit notification request information to the accounting status notification apparatus, a radio communication interface, or the like may alternatively be applied for the purpose of the present invention.

While the CPU 100, the communication processing section 114 and the network interface 115 of the client terminal 2 described above by referring to FIGS. 1 through 24 are made to operate as notification information receiving means for receiving accounting status notification information transmitted from the accounting status notification apparatus in response to the transmission of notification request information to the accounting status notification apparatus in the above-described embodiment, the present invention is by no means limited thereto. Any of various notification information receiving means such as a notification information reception circuit, which is a hardware circuit adapted to receive accounting status notification information, or a radio communication interface may alternatively be applied for the purpose of the present invention.

When acquisition of contents data is requested in the above described embodiment, the CPU 100 of the client terminal 2 that temporarily stores the contents identification information already stored in the hard disk drive 104 is made to operate as identification information temporary storage means for temporarily storing contents identification information of the contents data that are requested to be acquired. However, the present invention is by no means limited thereto. Alternatively, any of a variety of identification information temporary storage means such as an identification information temporary storage circuit, which is a hardware circuit adapted to temporarily store contents identification information, may be applied for the purpose of the present invention As attribute request information that requests contents attribute information for the purpose of altering the attributes of the contents data that correspond to the temporarily stored contents identification information is transmitted from the attribute request information transmitting means to the attribute information providing apparatus, the contents attribute information received by the attribute information reception means as a result is related to the contents data that correspond to the temporarily stored contents identification information and stored in a storage means, to which the CPU 100 of the client terminal 2, which is described above by referring to FIGS. 1 through 24, is applied in the above described embodiment. However, the present invention is by no means limited thereto. Alternatively, any of a variety of identification storage means such as a storage circuit, which is a hardware circuit adapted to relate the contents attribute information to the contents data that correspond to the temporarily stored contents identification information, may be applied for the purpose of the present invention.

If the contents attribute information is neither related to the contents data that correspond to the temporarily stored contents identification information nor stored when the communication line to the attribute information providing apparatus is disconnected while receiving the contents attribute information and subsequently the communication line to the attribute information providing apparatus recovers a communicable state, the CPU 100 of the client terminal 2, which is described above by referring to FIGS. 1 through 24, is applied to the disconnection judging means for judging if the communication line is disconnected or not in the above-described embodiment. However, the present invention is by no means limited thereto. Alternatively, any of a variety of disconnection judging means such as a disconnection judging circuit, which is a hardware circuit adapted to judge that the communication line is disconnected if the contents attribute information is neither related to the contents data that correspond to the temporarily stored contents identification information nor stored when the communication line to the attribute information providing apparatus is disconnected while receiving the contents attribute information and subsequently the communication line to the attribute information providing apparatus recovers a communicable state may be applied for the purpose of the present invention.

Contents attribute information is transmitted from the attribute information providing apparatus and received by the attribute information acquisition apparatus in response to the transmission of attribute request information requesting contents attribute information for altering the attributes of the contents data stored in the storage medium and, if the communication line to the attribute information providing apparatus is disconnected while receiving the contents attribute information and subsequently the communication line to the attribute information providing apparatus recovers a communicable state, the control section 10 and the data communication processing section 14 of the portal server 4, which are described above by referring to FIGS. 1 through 24, are applied to the notification request information reception means for receiving the notification request information requesting accounting status notification information that indicates if the accounting process corresponding to the contents attribute information is completed or not in the above-described embodiment. However, the present invention is by no means limited thereto. Alternatively, any of a variety of notification request information reception means such as a notification request information reception circuit, which is a hardware circuit adapted to receive notification request information, or a radio communication interface may be applied for the purpose of the present invention.

While the control section 10 and the data communication processing section 14 of the portal server 4, which are described above by referring to FIGS. 1 through 24, are applied to the notification information transmission means for transmitting accounting status notification information to the attribute information acquisition apparatus in response to the received notification request information in the above described embodiment, the present invention is by no means limited thereto. Alternatively, any of a variety of notification information transmission means such as a notification information transmission circuit, which is a hardware circuit adapted to transmit accounting status notification information to the attribute information acquisition apparatus, and a control section and a radio communication interface may be applied for the purpose of the present invention.

While the control section 10 and the user database 13 of the portal server 4, which are described above by referring to FIGS. 1 through 24, are applied to the identification information storage means for storing accounting identification information which can identify accounting process corresponding to the contents attribute information by the attribute information acquiring process in the above-described embodiment, the present invention is by no means limited thereto. Alternatively, any of a variety of identification information storage means such as an identification information storage circuit, which is a hardware circuit adapted to store accounting identification information, a control section 10 and a RAM 12 may be applied for the purpose of the present invention.

While the control section 10 and the data communication processing section 14 of the portal server 4, which are described above by referring to FIGS. 1 through 24, are applied to the identification information transmission means for transmitting accounting identification information to the attribute information acquisition apparatus in the above-described embodiment, the present invention is by no means limited. thereto. Alternatively, any of a variety of identification information transmission means such as an identification information transmission circuit, which is a hardware circuit adapted to transmit accounting status information to the attribute information acquisition apparatus, and a radio communication interface may be applied for the purpose of the present invention.

While contents IDs and track file names, which are described above by referring to FIGS. 1 through 24, are applied to contents identification information that can be used to identify contents data in the above-described embodiment, the present invention is by no means limited thereto. Alternatively, any of a variety of contents identification information that can be used to identify contents data such as contents names may be applied for the purpose of the present invention.

While file names of contents attribute files 47 and file names of attribute information, which are described above by referring to FIGS. 1 through 24, are applied to contents attribute identification information that can be used to identify contents attribute information in the above described embodiment, the present invention is by no means limited thereto. Alternatively, any of a variety of contents attribute identification information that can be used to identify contents attribute information such as ID information and/or titles specific to contents attribute information may be applied for the purpose of the present invention.

INDUSTRIAL APPLICABILITY

The present invention can be utilized for data distribution systems comprising personal computers and a portal server which comprises a computer and is connected to the personal computers by way of communication lines such as the Internet and/or radio LANs (local area networks).

The invention claimed is:

1. An attribute information acquisition method for an acquisition information apparatus, the attribute information acquisition method comprising:
   transmitting, from the acquisition information apparatus, an attribute request for contents attribute information for altering attributes of contents data stored in a storage medium to an attribute information providing apparatus, the attribute request including an accounting ID identifying an accounting process corresponding to the contents attribute information;
   receiving, at the acquisition information apparatus, the contents attribute information transmitted from the attribute information providing apparatus as a result of the transmission of the attribute request;
   storing, in a memory device of the acquisition information apparatus, contents attribute identification information identifying the contents attribute information, when the receiving the contents attribute information is complete;
   judging, at the acquisition information apparatus, that the communication with the attribute information providing apparatus was interrupted during the receiving the contents attribute information, if the contents attribute identification information is not stored in the acquisition information apparatus;
   transmitting, from the acquisition information apparatus, to the attribute information providing apparatus, an accounting status notification request for an accounting status notification that indicates whether the accounting process that corresponds to the contents attribute information has been completed, in response to a restoration of a communication enabled state with the attribute information providing apparatus after the acquisition information apparatus judges that the communication with the attribute information providing apparatus was interrupted during the receiving the contents attribute information, the accounting status notification request including the accounting ID; and
   receiving, at the acquisition information apparatus, the accounting status notification associated with the accounting ID, transmitted from the attribute information providing apparatus as a result of the transmitting the accounting status notification request.

2. The method according to claim 1, further comprising:
   transmitting a file request to an acquisition/use information providing apparatus for an acquisition/use file that contains a contents providing address and an attribute information providing address corresponding to a contents data acquisition request;
   receiving the acquisition/use file transmitted from the acquisition/use information providing apparatus in response to the transmission of the file request;
   storing the acquisition/use file temporarily;
   accessing the contents providing address;
   transmitting a contents request for the contents data to a contents providing apparatus;

receiving the contents data transmitted from the contents providing apparatus in response to the transmission of the contents request; and storing temporarily contents identification information identifying the contents data after the completion of the receiving the contents data, wherein the transmitting the attribute request is executed after the storing temporarily the contents identification information.

3. The method according to claim 2, further comprising:

relating the contents data to the contents attribute information and registering the contents data and the contents attribute information in a database; and erasing the temporarily stored contents identification information and the contents attribute identification information, after a completion of the registration of the contents data and the contents attribute information in the database.

4. The method according to claim 3, further comprising:

erasing the acquisition/use file in response to the restoration of the communication enabled state, wherein the transmitting to the attribute information providing apparatus is executed after the erasing the acquisition/use file.

5. The method according to claim 4, further comprising:

receiving a most updated acquisition/use file as a result of again executing the transmitting the file request and the receiving the acquisition/use file, after the receiving the accounting status notification;

temporarily storing the most updated acquisition/use file; and detecting whether contents identification information corresponding to a contents providing address contained in the most updated acquisition/use file is temporarily stored; and accessing the contents providing address contained in the most updated acquisition/use file and transmitting a contents request for the contents data identified by the contents identification information to the contents providing apparatus, when it is detected in the detecting that the contents identification information is not temporarily stored.

6. The method according to claim 5, further comprising:

detecting whether the contents attribute identification information, which corresponds to the contents identification information, is temporarily stored, when it is detected that the contents identification information is temporarily stored; and transmitting an other attribute request for the contents attribute information to the attribute information providing apparatus when the contents attribute identification information is detected not to be temporarily stored.

7. The method according to claim 6, further comprising:

detecting whether the contents data and the contents attribute information are registered in the database, when it is detected that the contents attribute identification information is temporarily stored; and relating the contents data and the contents attribute information and registering the contents data and the contents attribute information in the database, when it is detected that the contents data and the contents attribute information are not registered in the database.

8. The method according to claim 1, further comprising:

transmitting a file request to an acquisition/use information providing apparatus for an acquisition/use file that contains a contents acquiring address and an attribute information acquiring address corresponding to an acquisition request for acquiring the contents data;

receiving the acquisition/use file transmitted from the acquisition/use information providing apparatus in response to the transmitting the file request;

storing the acquisition/use file temporarily;

generating contents identification information that corresponds to the contents acquiring address;

generating contents attribute address identification information identifying the attribute information acquiring address that corresponds to the contents acquiring address;

storing the contents identification information and the contents attribute address identification information temporarily;

accessing the contents acquiring address;

transmitting a contents request for the contents data to a contents providing apparatus, after the storing the contents identification information and the contents attribute address identification information temporarily; and receiving the contents data, which is transmitted from the contents providing apparatus, in response to the transmitting the contents request, wherein the transmitting the attribute request is executed after the receiving the contents data.

9. The method according to claim 8, further comprising:

relating the contents data to the contents attribute information and registering the contents data and the contents attribute information in a database, after the receiving the contents attribute information; and erasing the temporarily stored contents identification information and the contents attribute address identification information, which correspond respectively to the contents data and the contents attribute information, after a completion of the registering the contents data and the contents attribute information in the database.

10. The method according to claim 9, further comprising:

detecting whether the temporarily stored contents identification information and the temporarily stored contents attribute address identification information have been left unerased, in response to the restoration of the communication enabled state after the communication was interrupted;

erasing the contents data and the contents attribute information as well as the contents data and the contents attribute information registered in the database, when it is detected that the temporarily stored contents identification information and the temporarily stored contents attribute information have been left unerased, wherein the transmitting to the attribute information providing apparatus is executed after the erasing the contents data.

11. The method according to claim 10, further comprising:

erasing the temporarily stored contents identification information and the temporarily stored contents attribute information after the receiving the accounting status notification; and transmitting the file request to the acquisition/use information providing apparatus once again after the receiving the accounting status notification.

12. An accounting status notification method for an attribute information providing apparatus, the accounting status notification method comprising:

transmitting, upon an availability from an accounting information apparatus, accounting completion data that includes an accounting ID to an attribute providing apparatus wherein the attribute providing apparatus manages accounting status notification information;

receiving, at the attribute information providing apparatus, a notification request from an acquisition information apparatus for accounting status notification information that indicates whether an accounting process has been completed, in response to a restoration of a communication enabled state at the acquisition information apparatus after a communication with the attribute information providing apparatus was interrupted at a time of receiving contents attribute information at the acquisition information apparatus, the contents attribute information being transmitted from the attribute information providing apparatus as a result of a transmission of an attribute request for the contents attribute information to the attribute information providing apparatus; and transmitting the accounting status notification information corresponding to the received notification request to the acquisition information apparatus.

13. The method according to claim 12, further comprising:

transmitting the accounting ID to the acquisition information apparatus, the accounting ID identifying the accounting process corresponding to the contents attribute information, wherein the transmitting the accounting status notification information includes, specifying the accounting status notification information according to the accounting ID, and transmitting the specified accounting status notification information to the acquisition information apparatus.

14. An acquisition information apparatus, comprising:

means for transmitting an attribute request for contents attribute information for altering attributes of contents data stored in a storage medium to an attribute information providing apparatus, the attribute request including an accounting ID identifying an accounting process corresponding to the contents attribute information;

means for receiving the contents attribute information transmitted from the attribute information providing apparatus as a result of the transmission of the attribute request;

means for storing contents attribute identification information identifying the contents attribute information, when the means for receiving completes a reception of the contents attribute information;

means for judging that the communication with the attribute information providing apparatus was interrupted during the reception of the contents attribute information, if the contents attribute identification information is not stored in the means for storing;

means for transmitting to the attribute information providing apparatus, an accounting status notification request for an accounting status notification that indicates whether the accounting process that corresponds to the contents attribute information has been completed, in response to a restoration of a communication enabled state with the attribute information providing apparatus after the means for judging judges that the communication with the attribute information providing apparatus was interrupted while the contents attribute information was being received, the accounting status notification request including the accounting ID; and means for receiving the accounting status notification associated with the accounting ID, transmitted from the attribute information providing apparatus as a result of transmitting the accounting status notification request.

15. An attribute information providing apparatus, comprising:

means for transmitting accounting completion data that includes an accounting ID to an attribute providing apparatus that manages accounting status notification information, and for receiving a notification request from an acquisition information apparatus for accounting status notification information that indicates whether an accounting process has been completed, in response to a restoration of a communication enabled state at the acquisition information apparatus after a communication with the attribute information providing apparatus was interrupted at a time of receiving contents attribute information at the acquisition information apparatus, the contents attribute information being transmitted from the attribute information providing apparatus as a result of a transmission of an attribute request for the contents attribute information to the attribute information providing apparatus; and means for transmitting the accounting status notification information corresponding to the received notification request to the acquisition information apparatus.

16. A computer readable medium storing an acquisition information program that, when executed by an acquisition information apparatus, causes the acquisition information apparatus to execute a method comprising:

transmitting an attribute request, from the acquisition information apparatus, for contents attribute information for altering attributes of contents data stored in a storage medium to an attribute information providing apparatus, the attribute request including an accounting ID identifying an accounting process corresponding to the contents attribute information;

receiving, at the acquisition information apparatus, the contents attribute information transmitted from the attribute information providing apparatus as a result of the transmitting the attribute request;

storing in a memory device of the acquisition information apparatus contents attribute identification information identifying the contents attribute information, when the receiving the contents attribute information is complete;

judging, at the acquisition information apparatus, that the communication with the attribute information providing apparatus was interrupted during the receiving the contents attribute information, if the contents attribute identification information is not stored in the memory device;

transmitting, from the acquisition information apparatus, to the attribute information providing apparatus, an accounting status notification request for an accounting status notification that indicates whether the accounting process that corresponds to the contents attribute information has been completed, in response to a restoration of a communication enabled state with the attribute information providing apparatus after the judging judges that the communication with the attribute information providing apparatus was interrupted during the receiving the contents attribute information, the accounting status notification request including the accounting ID; and receiving, at the acquisition information apparatus, the accounting status notification associated with the accounting ID, transmitted from the attribute information providing apparatus as a result of the transmitting the accounting status notification request.

17. A computer readable medium storing an attribute information providing program that, when executed by an attribute information providing apparatus, causes the attribute information providing apparatus to execute a method comprising:

transmitting, upon an availability from an accounting information apparatus, accounting completion data that includes an accounting ID to an attribute providing apparatus wherein the attribute providing apparatus manages accounting status notification information;

receiving a notification request, from an acquisition information apparatus, at the attribute information providing apparatus, for accounting status notification information that indicates whether an accounting process has been completed, in response to a restoration of a communication enabled state at the acquisition information apparatus after a communication with the attribute information providing apparatus was interrupted at a time of receiving contents attribute information at the acquisition information apparatus, the contents attribute information being transmitted from the attribute information providing apparatus as a result of a transmission of an attribute request for the contents attribute information to the attribute information providing apparatus; and transmitting the accounting status notification information corresponding to the received notification request to the acquisition information apparatus.

18. An acquisition information apparatus, comprising:

a first transmission unit configured to transmit an attribute request for contents attribute information for altering attributes of contents data stored in a storage medium to an attribute information providing apparatus, the attribute request including an accounting ID identifying an accounting process corresponding to the contents attribute information;

a first reception unit configured to receive the contents attribute information transmitted from the attribute information providing apparatus as a result of the transmission of the attribute request;

a memory configured to store contents attribute identification information identifying the contents attribute information, when the receiving the contents attribute information is complete;

a processing device configured to judge that the communication with the attribute information providing apparatus was interrupted during the receiving the contents attribute information, if the contents attribute identification information is not stored in the memory;

a second transmission unit configured to transmit to the attribute information providing apparatus, an accounting status notification request for an accounting status notification that indicates whether the accounting process that corresponds to the contents attribute information has been completed, in response to a restoration of a communication enabled state with the attribute information providing apparatus after the processing device judges that the communication with the attribute information providing apparatus was interrupted while the contents attribute information was being received, the accounting status notification request including the accounting ID; and a second reception unit configured to receive the accounting status notification associated with the accounting ID, transmitted from the attribute information providing apparatus as a result of the transmission of the accounting status notification request.

19. An attribute information providing apparatus, comprising:

a communication unit configured to transmit accounting completion data that includes an accounting ID to an attribute providing apparatus that manages accounting status notification information, and to receive a notification request from an acquisition information apparatus for accounting status notification information that indicates whether an accounting process has been completed, in response to a restoration of a communication enabled state at the acquisition information apparatus after a communication with the attribute information providing apparatus was interrupted at a time of receiving contents attribute information at the acquisition information apparatus, the contents attribute information being transmitted from the attribute information providing apparatus as a result of a transmission of an attribute request for the contents attribute information to the attribute information providing apparatus; and a transmission unit configured to transmit the accounting status notification information corresponding to the received notification request to the acquisition information apparatus.

* * * * *